(12) United States Patent
Urano et al.

(10) Patent No.: US 10,227,073 B2
(45) Date of Patent: Mar. 12, 2019

(54) VEHICLE SYSTEM

(71) Applicant: TOYOTA JIDOSHA KABUSHIKI KAISHA, Toyota-shi, Aichi-ken (JP)

(72) Inventors: Hiromitsu Urano, Numazu (JP); Kentaro Ichikawa, Shizuoka-ken (JP); Taisuke Sugaiwa, Susono (JP); Toshiki Kindo, Yokohama (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 331 days.

(21) Appl. No.: 14/996,973

(22) Filed: Jan. 15, 2016

(65) Prior Publication Data
US 2016/0207537 A1 Jul. 21, 2016

(30) Foreign Application Priority Data

Jan. 19, 2015 (JP) ................... 2015-008122

(51) Int. Cl.
*B60W 30/182* (2012.01)
*G05D 1/00* (2006.01)
*B62D 1/28* (2006.01)
*B62D 15/02* (2006.01)
*B60W 50/14* (2012.01)
*B60W 50/16* (2012.01)
*B60W 50/00* (2006.01)

(52) U.S. Cl.
CPC .......... *B60W 30/182* (2013.01); *B60W 50/14* (2013.01); *B60W 50/16* (2013.01); *B62D 1/286* (2013.01); *B62D 15/025* (2013.01); *G05D 1/0061* (2013.01); *G05D 1/0088* (2013.01); *B60W 2050/007* (2013.01); *B60W 2050/143* (2013.01); *B60W 2050/146* (2013.01); *B60W 2540/00* (2013.01); *B60W 2540/10* (2013.01); *B60W 2540/12* (2013.01); *B60W 2540/18* (2013.01); *B60W 2550/00* (2013.01); *B60W 2900/00* (2013.01); *G05D 2201/0213* (2013.01)

(58) Field of Classification Search
None
See application file for complete search history.

(56) References Cited

U.S. PATENT DOCUMENTS 8,670,891 B1 * 3/2014 Szybalski ............ B62D 1/286
701/23
2009/0322503 A1 12/2009 Suzuki et al.

FOREIGN PATENT DOCUMENTS

JP 2007-196809 A 8/2007
JP 2008-74321 A 4/2008
(Continued)

*Primary Examiner* — Rami Khatib
*Assistant Examiner* — Gerrad A Foster
(74) *Attorney, Agent, or Firm* — Sughrue Mion, PLLC

(57) ABSTRACT

A vehicle system includes a driving operation information acquisition unit acquiring an operation amount of a driver's driving operation, a driving state switching unit switching a driving state of a vehicle between a first driving state and a second driving state based on a relationship between the operation amount and a first threshold, the first driving state including at least one of an autonomous driving state and a cooperative driving state, and the second driving state allowing the driver's driving operation to be reflected in the traveling of the vehicle, and a notification unit notifying a driver of a relationship between the first threshold and a state of the operation amount.

6 Claims, 16 Drawing Sheets

(56) References Cited

FOREIGN PATENT DOCUMENTS

JP 2011-140275 A 7/2011
WO 2014/165681 A1 10/2014

* cited by examiner

FIG. 5
| | REFERENCE POSITION | ROTATION POSITION |
|---|---|---|
| STATE OF STEERING WHEEL |  | 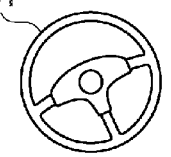 |
| FIRST DISPLAY EXAMPLE (ABSTRACT REPRESENTATION) | 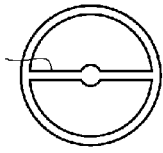 | 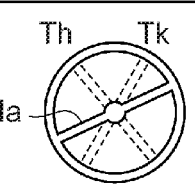 |
| SECOND DISPLAY EXAMPLE (ABSTRACT REPRESENTATION) | 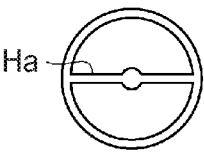 | 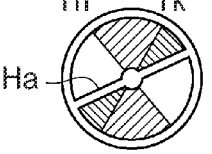 |
| THIRD DISPLAY EXAMPLE (METER) | 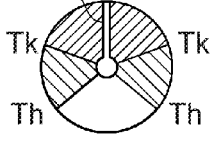 | 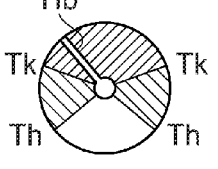 |
| FOURTH DISPLAY EXAMPLE (SLIDE BAR) | 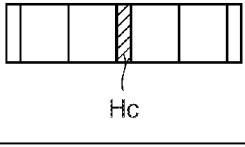 | 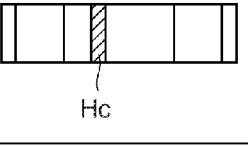 |
| FIFTH DISPLAY EXAMPLE (NUMERICAL VALUE) | 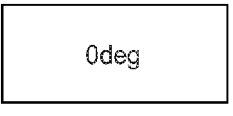 | 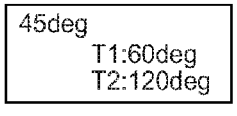 |

VEHICLE SYSTEM

CROSS REFERENCE TO RELATED APPLICATION

This application claims priority from Japanese Patent Application No. 2015-008122, filed on Jan. 19, 2015, the disclosure of which is incorporated herein by reference in its entirety.

BACKGROUND

1. Field

This disclosure relates to a vehicle system.

2. Description of Related Art

U.S. Pat. No. 8,670,891 is related to a vehicle system. According to the description of U.S. Pat. No. 8,670,891, at least one of the operation amount of a driver's steering operation, the operation amount of the driver's brake operation, and the operation amount of the driver's accelerator operation is monitored during the autonomous driving of a vehicle. In a case where the monitored operation amount exceeds a predetermined threshold, the autonomous driving state is discontinued and the vehicle system switches a manual driving state.

SUMMARY

However, switching to the manual driving state at an intended timing is sometimes difficult for the driver, because the driver does not know the predetermined threshold amount for switching from the autonomous driving state to the manual driving state. This issue is common to many driving support controls, such as lane keeping assist (LKA), adaptive cruise control (ACC), and the like.

The present disclosure provides a vehicle system that finds out the minimum operation amount input by the driver for the switching from the autonomous driving state to the manual driving state.

A vehicle system according to an aspect of the disclosure includes a driving operation information acquisition unit acquiring an operation amount of a driver's driving operation, a driving state switching unit switching a driving state of a vehicle between a first driving state and a second driving state based on a relationship between the operation amount and a first threshold, the first driving state including at least one of an autonomous driving state where traveling of the vehicle is controlled by using a traveling plan generated based on peripheral information regarding the vehicle and map information provided in advance for the vehicle and a cooperative driving state where the vehicle is allowed to travel with a vehicle control based on the peripheral information regarding the vehicle and the driver's driving operation working in tandem with each other and the second driving state allowing the driver's driving operation to be reflected in the traveling of the vehicle, and a notification unit notifying a driver of a relationship between the first threshold and a state of the operation amount.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a flowchart showing an example of traveling plan generating processing;

DETAILED DESCRIPTION

Figure 1:
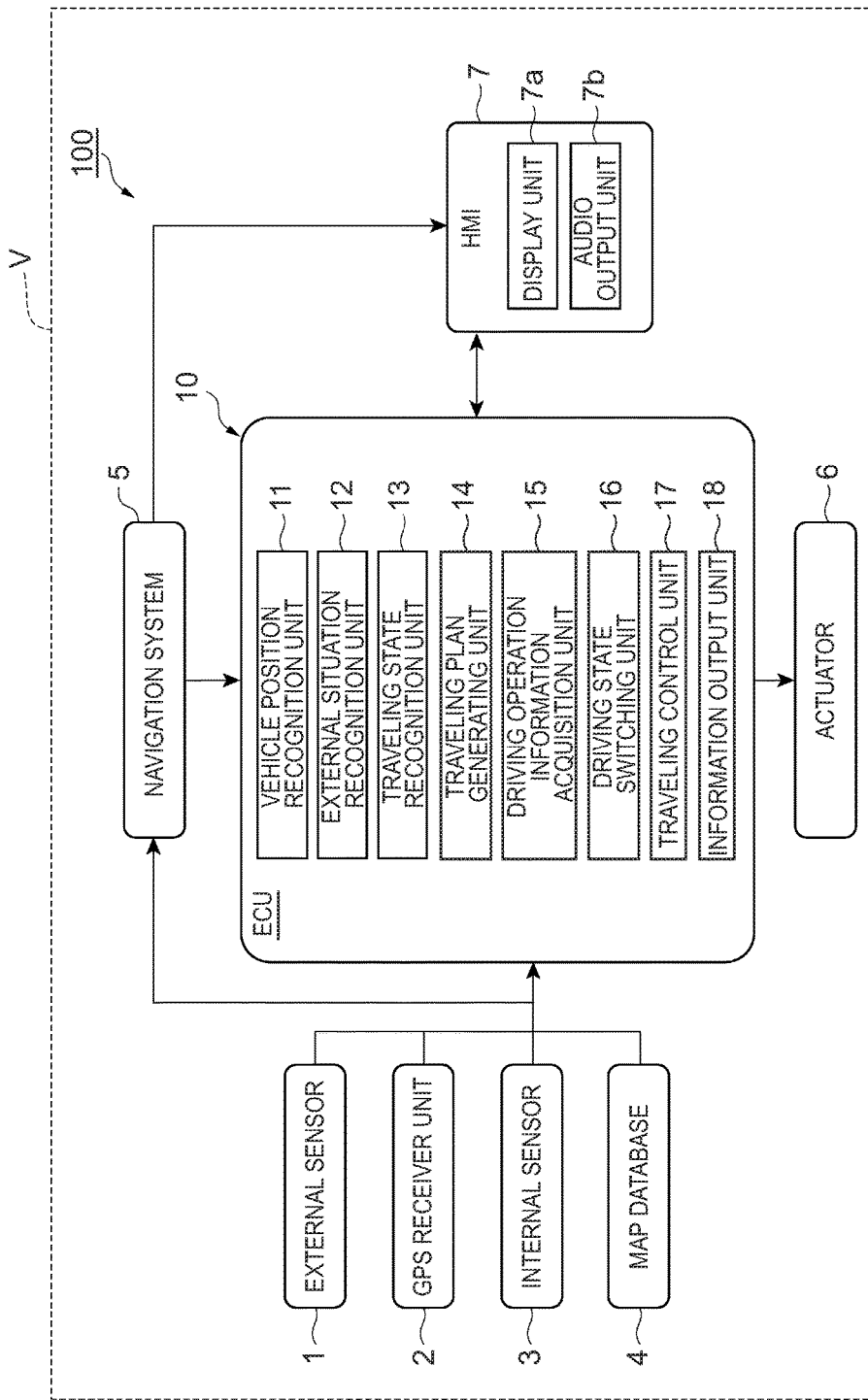
FIG. 1 is a block diagram illustrating the configuration of a vehicle system 100 according to this embodiment.

Hereinafter, an embodiment of the disclosure will be described with reference to accompanying drawings. In the drawings, the same reference numerals will be used to refer to the same or corresponding parts and repetitive description will be omitted.

Figure 2:
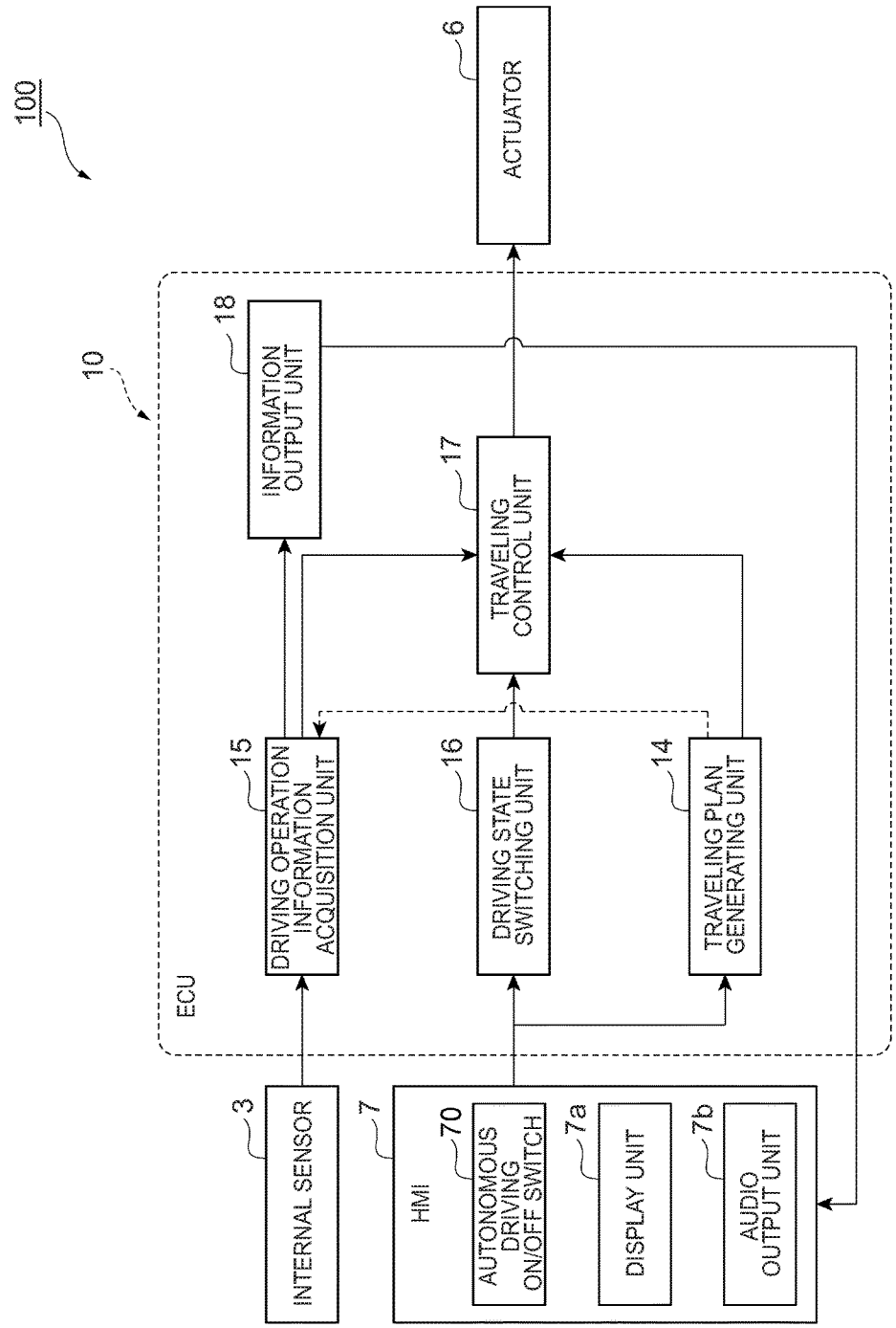
FIG. 2 is a block diagram showing the ECU in FIG. 1.

FIG. 1 is a block diagram illustrating the configuration of a vehicle system 100 according to this embodiment. FIG. 2 is a block diagram showing an electronic control unit (ECU)

10 of the vehicle system 100 in FIG. 1. As illustrated in FIG. 1, the vehicle system 100 is mounted on a vehicle V such as a passenger car. The vehicle system 100 is provided with an external sensor 1, a global positioning system (GPS) receiver 2, an internal sensor 3, a map database 4, a navigation system 5, an actuator 6, a human machine interface (HMI) 7, and the ECU 10.

The external sensor 1 is a detecting instrument that detects peripheral information that is outside of the vehicle V. The external sensor 1 may be embodied as any one or more of a camera, a radar, laser imaging detection and ranging (LIDAR), and the like.

The camera may be disposed on, for example, a front side or a back side of the windshield of the vehicle V. The camera may be a monocular camera having one imaging sensor or a stereo camera having two imaging sensors arranged to reproduce binocular disparity. Depth-direction information is included in the information imaged by the stereo camera. The camera outputs the image information to the ECU 10. The image information is related to an area outside the vehicle V.

The radar detects an object outside the vehicle V by using radio waves. The radio waves are, for example, millimeter waves. The radar detects the object by transmitting the radio waves to an area surrounding the vehicle V and receiving the radio waves reflected by the object. For example, the radar can output, as object information, the distance to the object, the direction of the object, etc. The radar outputs the detected object information to the ECU 10. In a case where sensor fusion is performed, reception information regarding the reflected radio waves may be output to the ECU 10.

The LIDAR detects an object outside the vehicle V by using light. The LIDAR measures the distance to a reflection point and detects the object by transmitting the light to an area surrounding the vehicle V and receiving the light reflected by the object. For example, the LIDAR can output, as object information, the distance to the object, the direction of the object, etc. The LIDAR outputs the detected object information to the ECU 10. In a case where sensor fusion is performed, reception information regarding the reflected light may be output to the ECU 10. The camera, the LIDAR, and the radar do not necessarily have to be provided in an overlapping manner.

The GPS receiver 2 acquires positional information showing the position of the vehicle V by receiving signals from at least three GPS satellites. The positional information includes, for example, latitude and longitude. The GPS receiver 2 outputs the measured positional information of the vehicle V to the ECU 10. The latitude and the longitude of the vehicle V may be identified using other known methods in place of the GPS receiver 2.

The internal sensor 3 is a detector that detects information correlated with the traveling state of the vehicle V and information correlated with a driving operation carried out by a driver who drives the vehicle V (driving operation information). The internal sensor 3 may include at least one of a vehicle speed sensor, an acceleration sensor, a yaw rate sensor, and the like, so as to detect the information correlated with the traveling state of the vehicle V. In addition, the internal sensor 3 may include at least one of an accelerator pedal sensor, a brake pedal sensor, and a steering sensor so as to detect the driving operation information.

The vehicle speed sensor is a detector that detects the speed of the vehicle V. A vehicle wheel speed sensor an example of the vehicle speed sensor. The vehicle wheel speed sensor is disposed with respect to a vehicle wheel of the vehicle V, a drive shaft that rotates integrally with the vehicle wheel, or the like and detects the rotation speed of the vehicle wheel. The vehicle speed sensor outputs vehicle speed information (vehicle wheel speed information), which includes the speed of the vehicle V, to the ECU 10.

The acceleration sensor is a detector that detects the acceleration of the vehicle V. The acceleration sensor includes, for example, a longitudinal acceleration sensor that detects the longitudinal acceleration of the vehicle V and a lateral acceleration sensor that detects the lateral acceleration of the vehicle V. The acceleration sensor outputs acceleration information, which includes the acceleration of the vehicle V, to the ECU 10.

The yaw rate sensor is a detector that detects the yaw rate (rotational angular velocity) about the vertical axis of the center of gravity of the vehicle V. A gyro sensor is an example of the yaw rate sensor that may be used. The yaw rate sensor outputs yaw rate information, which includes the yaw rate of the vehicle V, to the ECU 10.

The accelerator pedal sensor is a detector that detects, for example, an accelerator pedal depression amount. The accelerator pedal depression amount is, for example, the position of an accelerator pedal (pedal position) with respect to a predetermined position as a reference. The predetermined position may be a fixed position or may be a position changed by a predetermined parameter. The accelerator pedal sensor is disposed with respect to, for example, a shaft part of the accelerator pedal of the vehicle V. The accelerator pedal sensor outputs operation information correlated with the accelerator pedal depression amount to the ECU 10. The accelerator pedal sensor detects a pedal position reflecting both an accelerator pedal operation and a system control input in a case where the pedal position of the accelerator pedal is moved in accordance with an accelerator pedal control target value included in a traveling plan (described later). The accelerator pedal sensor detects a pedal position correlated with the accelerator pedal operation in a case where the pedal position of the accelerator pedal is not moved in accordance with the accelerator pedal control target value included in the traveling plan (described later).

The brake pedal sensor is a detector that detects, for example, a brake pedal depression amount. The brake pedal depression amount is, for example, the position of a brake pedal (pedal position) with respect to a predetermined position as a reference. The predetermined position may be a fixed position or may be a position changed by a predetermined parameter. The brake pedal sensor is disposed with respect to, for example, a part of the brake pedal. The brake pedal sensor may detect a brake pedal operating force (brake pedal tread force, master cylinder pressure, or the like). The brake pedal sensor outputs operation information correlated with the brake pedal depression amount or the operating force to the ECU 10. The brake pedal sensor detects a pedal position reflecting both a brake pedal operation and the system control input in a case where the pedal position of the brake pedal is moved in accordance with a brake pedal control target value included in the traveling plan (described later). The brake pedal sensor detects a pedal position correlated with the brake pedal operation in a case where the pedal position of the brake pedal is not moved in accordance with the brake pedal control target value included in the traveling plan (described later).

The steering sensor is a detector that detects, for example, a steering rotation state. A detected value of the rotation state is, for example, steering torque or a steering angle. The steering sensor is disposed with respect to, for example, a steering shaft of the vehicle V. The steering sensor outputs information including at least one of the steering torque, the steering angle, and the like to the ECU 10. The steering sensor detects torque or a steering angle reflecting both a steering operation and the system control input in the case of steering rotation in accordance with a steering control target value included in the traveling plan (described later). Details regarding the acquisition of information on the operation amount of the driver's driving operation pertaining to this case will be described later. In the in case of no steering rotation, the steering sensor detects torque or a steering angle correlated with the steering operation in accordance with the steering control target value included in the traveling plan (described later).

The map database 4 is a database provided with map information. The map database 4 may be stored in a memory (e.g., a hard disk drive (HDD) or the like) mounted on the vehicle V. Examples of the map information include road positional information, road shape information, intersection and junction positional information, and the like. Examples of the road shape information include whether a section of the road is straight or curved, and the curvature of the curve. An output signal of the external sensor 1 may be included in the map information in a case where the vehicle system 100 uses positional information on a shielding structure such as a building and a wall or the simultaneous localization and mapping (SLAM) technique. The map database 4 may be stored in a computer in a facility such as an information processing center that is capable of communicating with the vehicle V.

The navigation system 5 is a device that guides the driver of the vehicle V to a destination set by the driver of the vehicle V. The navigation system 5 calculates a traveling route based on the positional information of the vehicle V measured by the GPS receiver 2 and the map information of the map database 4. The route may identify a traveling lane where the vehicle V travels in sections of a plurality of lanes. The navigation system 5 calculates, for example, a target route reaching the destination from the position of the vehicle V and informs the driver of the target route by display and/or speaker audio output. The navigation system 5 outputs, for example, information on the target route of the vehicle V to the ECU 10. The navigation system 5 may use information stored in the computer in the facility such as the information processing center that is capable of communicating with the vehicle V. Alternatively, part of the processing that is performed by the navigation system 5 may be performed by the computer in the facility.

The actuator 6 is a device that executes traveling control for the vehicle V. The actuator 6 includes at least a throttle actuator, a brake actuator, and a steering actuator. The throttle actuator controls the amount of air supplied to an engine (throttle opening degree) in accordance with a control signal from the ECU 10 and controls the driving force of the vehicle V. In a case where the vehicle V is a hybrid car or an electric car, the driving force is controlled by the control signal from the ECU 10 being input into a motor as a power source. In the case of an electric car, the throttle actuator is not included in the actuator 6.

The brake actuator controls a brake system in accordance with a control signal from the ECU 10 and controls the braking force that is applied to the vehicle wheel of the vehicle V. A hydraulic brake system can be used as an example of the brake system. The steering actuator controls the driving of a steering torque-controlling assist motor of an electric power steering system in accordance with a control signal from the ECU 10. In this manner, the steering actuator controls the steering torque of the vehicle V (steering torque).

The HMI 7 is an interface that allows information output and input between passengers in the vehicle V (including the driver) and the vehicle system 100. The HMI 7 is provided with, for example, a display 7a that displays image information to the driver, an audio output 7b for audio output, and an operation button or a touch panel that allows an input operation to be performed by the passenger. The display 7a may be any one or more of a combination meter MID, an instrument panel center display, a headup display (HUD), a driver-mounted glass-type wearable device, and the like. The display 7a displays the image information in accordance with a control signal from the ECU 10. The audio output 7b is a speaker that notifies the driver by warning sound or audio output. A plurality of speakers may constitute the audio output 7b or the audio output 7b may be configured to include a built-in speaker in the vehicle V. For example, the audio output 7b includes at least one of a speaker disposed on the back of the instrument panel of the vehicle V, a speaker disposed inside the door of the driver's seat of the vehicle V, and the like. The audio output 7b provides the driver with the warning sound or audio output in accordance with a control signal from the ECU 10. The display 7a and the audio output 7b do not necessarily constitute parts of the HMI 7. The display 7a and the audio output 7b may be provided separately.

As illustrated in FIG. 2, the HMI 7 includes an autonomous driving ON/OFF switch 70 that is an input that permits the passenger to start or stop theautonomous driving operation. The autonomous driving ON/OFF switch 70 may be configured to allow the passenger to input a request operation related to autonomous driving termination. When the request operation related to autonomous driving initiation or termination is carried out by the passenger, the autonomous driving ON/OFF switch 70 outputs information showing the autonomous driving initiation or the autonomous driving termination to the ECU 10. The input is not limited to a switch. The input may have any form insofar as information with which the driver's intention regarding the autonomous driving initiation or termination can be determined and input. For example, the input may be an autonomous driving initiation button, an autonomous driving termination button, a voice activated initiation and/or termination, an object of a switch or a button displayed on a screen (touch panel) that is operable by the driver, and the like. In a case where a destination is reached during autonomous driving, the HMI 7 notifies the passenger that they have arrived at the destination. The HMI 7 may output the information to the passenger by using a wirelessly-connected portable information terminal or may be subjected to the passenger's input operation by using the portable information terminal.

The ECU 10 that is illustrated in FIGS. 1 and 2 controls the autonomous traveling of the vehicle V. The ECU 10 is an electronic control unit that has a central processing unit (CPU), a read-only memory (ROM), a random access memory (RAM), and the like. The ECU 10 executes various types of control by loading a program stored in the ROM onto the RAM and executing the program with the CPU. A plurality of electronic control units may constitute the ECU 10.

As illustrated in FIGS. 1 and 2, the ECU 10 is provided with a vehicle position recognition unit 11, an external situation recognition unit 12, a traveling state recognition unit 13, a traveling plan generating unit 14, a driving operation information acquisition unit 15, a driving state switching unit 16, a traveling control unit 17, and an information output unit 18.

The vehicle position recognition unit 11 recognizes the position of the vehicle V on the map (hereinafter, referred to as a "vehicle position") based on the positional information of the vehicle V received by the GPS receiver 2 and the map information of the map database 4. The vehicle position recognition unit 11 may recognize the vehicle position by acquiring a vehicle position used in the navigation system 5 from the navigation system 5. In a case where the vehicle position of the vehicle V can be measured by a sensor disposed outside such as a sensor disposed on a road, the vehicle position recognition unit 11 may acquire the vehicle position from this sensor by communication (road-to-vehicle communication).

The external situation recognition unit 12 recognizes the external situation regarding the vehicle V based on a detection result of the external sensor 1. Examples of the detection result include the information imaged by the camera, the object information of the radar, and the object information of the LIDAR. Examples of the external situation may include the position of the white line of the traveling lane or the position of the center of the lane with respect to the vehicle V, the width of the road, the shape of the road, condition of the road, traffic on the road, obstacles in the road, and the like. Examples of the shape of the road may be the curvature of the traveling lane, a change in road surface gradient effective for forecast and estimate by the external sensor 1, undulation, or the like. The external situation may be a situation regarding an object such as an obstacle around the vehicle V. Examples of the situation regarding the object may include information for distinguishing a fixed obstacle from a moving obstacle, the position of the obstacle with respect to the vehicle V, the direction in which the obstacle moves with respect to the vehicle V, and the relative speed of the obstacle with respect to the vehicle V. The external situation recognition unit 12 may correct the position and the direction of the vehicle V acquired by the GPS receiver 2 or the like by referring to the detection result of the external sensor 1 and the map information so that accuracy is enhanced.

The traveling state recognition unit 13 recognizes the traveling state of the vehicle V based on a detection result of the internal sensor 3. Examples of the detection result of the internal sensor 3 include the vehicle speed information of the vehicle speed sensor, the acceleration information of the acceleration sensor, and the yaw rate information of the yaw rate sensor. Examples of the information showing the traveling state of the vehicle V include the speed, acceleration, and yaw rate of the vehicle.

The traveling plan generating unit 14 generates a course for the vehicle V based on, for example, the target route calculated by the navigation system 5, the vehicle position recognized by the vehicle position recognition unit 11, and the external situation regarding the vehicle V (including the position and orientation of the vehicle) recognized by the external situation recognition unit 12. The course is a trajectory of the vehicle V in the target route. The traveling plan generating unit 14 generates the course for the vehicle V to travel on the target route while satisfying references regarding safety, legal compliance, traveling efficiency, and the like. In addition, the traveling plan generating unit 14 generates the course for the vehicle V to avoid a contact with the object based on the situation of the object around the vehicle V.

The target route described in this specification includes a traveling route that is automatically generated based on the external situation and the map information when destination setting is not explicitly performed by the driver such as the traveling route along the road according to the "DRIVING SUPPORT DEVICE" described in Japanese Patent Publication No. 5382218 (WO 2011/158347) or the "AUTONOMOUS DRIVING DEVICE" described in Japanese Patent Application Publication No. 2011-162132.

The traveling plan generating unit 14 generates the traveling plan correlated with the generated course. The generated traveling plan may be predetermined. In other words, the traveling plan generating unit 14 generates the traveling plan along the target route set in advance on the map based on at least the external situation as the peripheral information regarding the vehicle V and the map information of the map database 4. Regarding the course of the vehicle V, the traveling plan generating unit 14 generates the traveling plan including a plurality of sets each having the two elements of a target position p and a target speed v at the target position in a coordinate system fixed to the vehicle V, that is, a plurality of configuration coordinates (p, v). Each of the plurality of target positions p has at least the positions of the x coordinate or the y coordinate in the coordinate system fixed to the vehicle V or information equivalent thereto. The traveling plan may include information showing a behavior of the vehicle V and is not limited to the plan including the configuration coordinates. For example, the traveling plan may include target time t instead of the target speed v as the information showing the behavior of the vehicle V. In addition, the traveling plan may include information related to the target time t and the orientation of the vehicle V at that moment in time.

In general, a traveling plan is sufficient insofar as the traveling plan is data showing a plan covering approximately a few seconds in the future from the current time. However, data showing a plan for tens of seconds ahead may be required depending on situations such as a right turn at an intersection and overtaking by the vehicle V. Assuming such a case, the number of the configuration coordinates of the traveling plan may be variable and the distance between the configuration coordinates may also be variable. In addition, a curve that connects the adjacent configuration coordinates to each other may be approximated by the use of a spline function or the like and a parameter of the approximated curve may be used as the traveling plan. Any known method can be adopted as a traveling plan generating method insofar as the behavior of the vehicle V can be expressed.

The traveling plan includes, for example, a control value that serves as a target when the vehicle system 100 controls the vehicle. For example, the traveling plan may be data showing the development of the vehicle speed, acceleration/deceleration, steering torque, and the like of the vehicle V during the traveling of the vehicle V in the course along the target route. In other words, the traveling plan may include the speed pattern, acceleration/deceleration pattern, and torque pattern of the vehicle V. Alternatively, the traveling plan may be data showing the development of the accelerator pedal control target value and the brake pedal control target value instead of the speed pattern and acceleration/deceleration pattern of the vehicle V. The traveling plan generating unit 14 may generate the traveling plan for the travel time (period of time required for the vehicle V to reach the destination) to be minimized.

The speed pattern is, for example, data including a target vehicle speed set in association with time for each target control position with respect to the target control positions set at predetermined intervals (for example, 1 m) on the course. The acceleration/deceleration pattern is, for example, data including a target acceleration/deceleration set in association with time for each target control position with respect to the target control positions set at predetermined intervals (for example, 1 m) on the course. The steering pattern is, for example, data including target steering torque set in association with time for each target control position with respect to the target control positions set at predetermined intervals (for example, 1 m) on the course. The data showing the development of the accelerator pedal control target value and the brake pedal control target value is, for example, data including a pedal position set in association with time for each target control position with respect to the target control positions set at predetermined intervals (for example, 1 m) on the course.

The traveling plan generating unit 14 generates the traveling plan in a case where, for example, the information showing the autonomous driving initiation is acquired from the autonomous driving ON/OFF switch 70. In addition, the traveling plan generating unit 14 outputs the generated traveling plan to the driving operation information acquisition unit 15 and the traveling control unit 17. In a case where the driving operation information acquisition unit 15 does not have to use the traveling plan, examples of which include a case where the state of the driving operation can be acquired by the use of nothing but a value detected by the internal sensor 3 (described later), the traveling plan generating unit 14 may not output the traveling plan to the driving operation information acquisition unit 15.

The driving operation information acquisition unit 15 acquires the driving operation information, which is information correlated with the driver's driving operation, based on the detection result of the internal sensor 3. For example, the driving operation information acquisition unit 15 acquires the operation amount of the driver's driving operation related to at least one of the steering operation, accelerator operation, and brake operation of the vehicle V as the driving operation information. The steering operation is, for example, is a steering wheel-rotating operation carried out by the driver. In other words, the driving operation information related to the steering operation includes the steering wheel operation amount (torque or steering angle). In the case of the steering rotation in the vehicle V in accordance with the steering control target value (target steering torque) included in the traveling plan, the driving operation information acquisition unit 15 acquires, as the operation amount of the steering operation, the difference between the steering rotation state detection value regarding the vehicle V which is detected by the steering sensor and the steering control target value which is included in the traveling plan generated by the traveling plan generating unit 14. The deviation from the control target value may need to be detected, and thus the difference between, for example, the differential value of the rotate state detection value and the differential value of the control target value may be used instead. In the case of no steering rotation in accordance with the steering control target value included in the traveling plan, the driving operation information acquisition unit 15 acquires the steering rotation state detection value regarding the vehicle V detected by the steering sensor as the operation amount of the steering operation. In any case, the driving operation information acquisition unit 15 may acquire the absolute value of the amount of the driver's operation. The accelerator operation is, for example, an accelerator pedal-depressing operation that is carried out by the driver. In other words, the driving operation information related to the acceleration operation includes information correlated with an accelerator pedal operation amount (depression amount). The brake operation is, for example, a brake pedal-depressing operation that is carried out by the driver. In other words, the driving operation information related to the brake pedal operation includes information correlated with a brake pedal operation amount (depression amount). As in the steering operation described above, the difference between the detected value and the control target value is calculated and the absolute value of the amount of the driver's operation is acquired in the accelerator operation and the brake operation in a case where the pedal position is changed in accordance with the system control value. In other words, the driving operation information acquisition unit 15 acquires the difference between the pedal position detection value regarding the accelerator pedal of the vehicle V and the accelerator pedal control target value included in the traveling plan as the operation amount of the accelerator operation in a case where the pedal position of the accelerator pedal of the vehicle V is moved in accordance with the accelerator pedal control target value included in the traveling plan. The accelerator pedal control target value may be derived from the vehicle speed, the acceleration/deceleration, and the like of the vehicle V included in the traveling plan. Likewise, the driving operation information acquisition unit 15 acquires the difference between the pedal position detection value regarding the brake pedal of the vehicle V and the brake pedal control target value included in the traveling plan as the operation amount of the brake operation in a case where the pedal position of the brake pedal of the vehicle V is moved in accordance with the brake pedal control target value included in the traveling plan. The brake pedal control target value may be derived from the vehicle speed, the acceleration/deceleration, and the like of the vehicle V included in the traveling plan. The driving operation information acquisition unit 15 outputs the driving operation information to the driving state switching unit 16, the traveling control unit 17, and the information output unit 18.

The driving state switching unit 16 switches the driving state of the vehicle V based on the driving operation information that is acquired by the driving operation information acquisition unit 15. The driving state of the vehicle V includes a vehicle control state (first driving state) and a manual driving state (second driving state). In this embodiment, the vehicle control state is divided into an autonomous driving state and a cooperative driving state.

Figure 3:
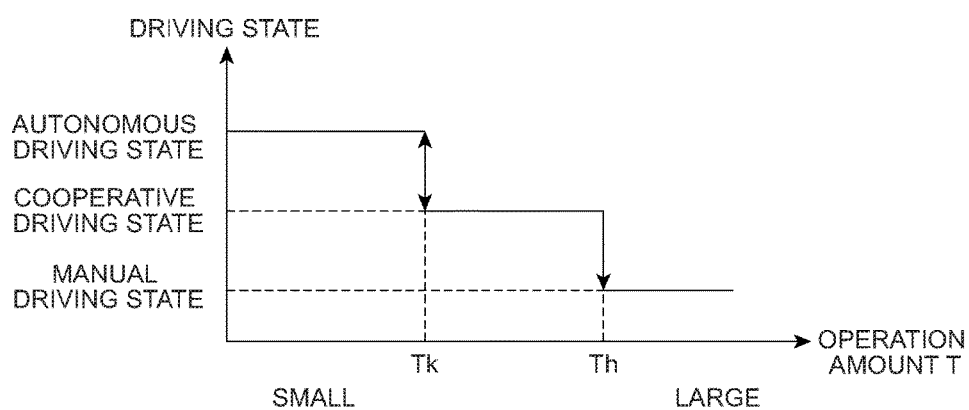
FIG. 3 is a diagram showing an example of a relationship between an operation amount and a driving state transition.

FIG. 3 is a diagram showing an example of a relationship between the operation amount and a driving state transition. The horizontal axis in FIG. 3 represents the operation amount T and the vertical axis represents the driving state. As illustrated in FIG. 3, transitions to and from the three driving states of the autonomous driving state, the cooperative driving state, and the manual driving state will be described in this embodiment.

The autonomous driving state is, for example, a state where the traveling of the vehicle V is controlled by the use of the traveling plan. In other words, the autonomous driving state is, for example, a state where the traveling of the vehicle V is realized based solely on the control by the vehicle system 100 in a state where the driver does not perform the driving operation and the driver does not intervene in the traveling of the vehicle V.

The cooperative driving state is, for example, a driving state where the vehicle V travels with vehicle control based on the peripheral information and the driver's driving operation working in tandem with each other. In other words, the cooperative driving state is a state where both the driver and the vehicle system 100 can be related to the traveling of the vehicle V, a state which allows system intervention, and a state where the traveling of the vehicle V is realized based on at least the operation amount T of the driver's driving operation. The cooperative driving state includes a state where driving support control for supporting the driver's driving operation is performed while the driver's driving operation serves as a main operation.

Lane keeping assist (LKA) is an example of the driving support control. The LKA is control for controlling the steering of the vehicle so that the vehicle does not deviate from the traveling lane. During the LKA, the driver's steering operation is reflected in the steering of the vehicle within a range in which, for example, the vehicle does not deviate from the traveling lane. In a case where the vehicle is likely to deviate from the traveling lane as a result of the driver's steering operation during the execution of the LKA, the vehicle system 100 controls the steering so that the vehicle returns into the traveling lane. Examples of the driving support control include adaptive cruise control (ACC). The ACC is, for example, control for performing constant-speed control in a case where no leading vehicle is present in front of the vehicle so that the vehicle travels at a constant set speed set in advance and performing following control in a case where a leading vehicle is present in front of the vehicle so that the vehicle speed of the vehicle is adjusted in accordance with the vehicle-to-vehicle distance from the leading vehicle. The vehicle system 100 decelerates the vehicle in accordance with the driver's brake operation even during the execution of the ACC. In addition, the vehicle system 100 may accelerate the vehicle, in accordance with the driver's accelerator operation, to a maximum permissible speed set in advance (for example, the legal maximum speed applied to the road on which the vehicle travels) even during the execution of the ACC.

The manual driving state is a state where the operation amount T of the driver's driving operation is reflected in the traveling of the vehicle V. In other words, the manual driving state is a state where the operation amount T of the driver's driving operation is reflected in the traveling of the vehicle V in a state where the system intervention is impossible.

The driving state switching unit 16 switches the driving state of the vehicle V to the autonomous driving state, the cooperative driving state, or the manual driving state based on the operation amount T of the driver's driving operation related to at least one of the steering operation, the accelerator operation, and the brake operation. In a case where the driving state of the vehicle V is the autonomous driving state and the operation amount T is less than an intervention determination threshold Tk, the autonomous driving state is maintained despite the driver's operation. The intervention determination threshold Tk is a value that is set in advance and a threshold for the determination of the presence or absence of the driver's operation intervention. In the first embodiment, the intervention determination threshold Tk is a threshold (second threshold) that is used for the determination of switching from the autonomous driving state to the cooperative driving state. The intervention determination threshold Tk is set to an appropriate value with respect to the steering operation, the accelerator operation, and the brake operation and in view of the type of each operation. In a case where the driving state of the vehicle V is the autonomous driving state and the operation amount T is equal to or greater than the intervention determination threshold Tk and less than a manual driving initiation threshold Th, the driving state of the vehicle V becomes the cooperative driving state. The manual driving initiation threshold Th is a value that is set in advance and a threshold (first threshold) for the determination of switching from the cooperative driving state (or the autonomous driving state) to the manual driving state. The manual driving initiation threshold Th is set to an appropriate value with respect to the steering operation, the accelerator operation, and the brake operation and in view of the type of each operation. In a case where the driving state of the vehicle V is the autonomous driving state or the cooperative driving state and the operation amount T is equal to or greater than the manual driving initiation threshold Th, the driving state of the vehicle V becomes the manual driving state.

Hereinafter, the determination (maintenance or transition) of the driving state of the vehicle V will be described. The maintenance or transition of the autonomous driving state will be described first. In a case where the driving state of the vehicle V is the autonomous driving state and the operation amount T is less than the intervention determination threshold Tk, the driving state switching unit 16 maintains the driving state of the vehicle V in the autonomous driving state. Then, the autonomous driving state is not cancelled even in a case where a steering operation without an intention to cancel the autonomous driving is detected, examples of which include a case where the driver unintentionally touches the steering wheel. Accordingly, the driving state switching unit 16 can avoid the driver's operation of the autonomous driving ON/OFF switch 70 for initiating the autonomous driving at every autonomous driving cancellation without the driver's intention, and thus the driver's inconvenience can be reduced and safety can be increased since the system will not switch from the autonomous driving mode to the manual driving mode unexpectedly.

In a case where the driving state of the vehicle V is the autonomous driving state and the operation amount T becomes equal to or greater than the intervention determination threshold Tk and less than the manual driving initiation threshold Th, the driving state switching unit 16 switches the driving state to the cooperative driving state. Then, the driving state of the vehicle V is subjected to a transition from the autonomous driving state to the cooperative driving state in a case where, for example, the driver operates the steering wheel by the operation amount T equal to or greater than the intervention determination threshold Tk and less than the manual driving initiation threshold Th so as to intervene in the vehicle in the autonomous driving state. The driving state of the vehicle V is switched to the cooperative driving state by the driving state switching unit 16 in a case where, for example, a large oncoming vehicle appears during the traveling in the autonomous driving state and the driver performs a driving operation for temporary traveling at a position slightly separated from the large vehicle. In this case, the vehicle V travels based on the operation amount T of the driver's operation in a state that allows the system intervention, and thus the vehicle system 100 can allow the vehicle V to travel at a position based on the driver's driving operation.

The driving state switching unit 16 may switch the driving state of the vehicle V to the manual driving state in a case where the driving state of the vehicle V is the autonomous driving state and the operation amount T becomes equal to or greater than the manual driving initiation threshold Th. In other words, the driving state of the vehicle V may be subjected to a direct transition from the autonomous driving state to the manual driving state not through the cooperative driving state.

Hereinafter, the maintenance or transition of the cooperative driving state will be described. The driving state switching unit 16 switches the driving state of the vehicle V from the cooperative driving state to the autonomous driving state in a case where the driving state of the vehicle V is the cooperative driving state and the operation amount T becomes less than the intervention determination threshold Tk. Then, the driving state is switched from the cooperative driving state to the autonomous driving state by the driving state switching unit 16 when, for example, the driver performs the driving operation so that the vehicle travels at the position slightly separated from large oncoming vehicle and the driver stops the driving operation after the vehicle and the oncoming vehicle pass each other. Since the driving state is automatically switched to the autonomous driving state based on the operation amount T in a case where operation intervention is temporary as described above, the driving state switching unit 16 can avoid the driver's operation of the autonomous driving ON/OFF switch 70 for initiating the autonomous driving at every temporary autonomous driving cancellation, and thus the driver's inconvenience can be reduced.

The driving state switching unit 16 maintains the cooperative driving state in a case where the driving state of the vehicle V is the cooperative driving state and the operation amount T remains equal to or greater than the intervention determination threshold Tk and less than the manual driving initiation threshold Th. The driving state switching unit 16 switches the driving state of the vehicle V from the cooperative driving state to the manual driving state in a case where the driving state of the vehicle V is the cooperative driving state and torque correlated with the steering operation becomes equal to or greater than the manual driving initiation threshold Th. Then, the operation amount T of the driver's driving operation is reflected in the traveling of the vehicle V in a state where the system intervention is impossible until the autonomous driving mode is reactivated by the driver.

Hereinafter, the maintenance or transition of the manual driving state will be described. In a case where, for example, the driving state of the vehicle V is the manual driving state, the driving state switching unit 16 maintains the driving state of the vehicle V in the manual driving state even when the operation amount T becomes less than the manual driving initiation threshold Th. When the driver performs a driving operation at a sufficient operation amount T with an intention to allow the manual driving state to continue in this case, subsequent switching to the autonomous driving state or the cooperative driving state is limited, and thus the driver's operation of the autonomous driving ON/OFF switch 70 for terminating the autonomous driving can be avoided. Accordingly, the driver's inconvenience can be reduced.

In a case where the driving state of the vehicle V is the manual driving state, the driving state switching unit 16 maintains the manual driving state until the autonomous driving initiation request operation is input into the autonomous driving ON/OFF switch 70. In other words, a transition to the cooperative driving state or the autonomous driving state is limited, even in a case where the operation amount T becomes less than the manual driving initiation threshold Th, until the autonomous driving initiation request operation is input. The period during which the manual driving state is maintained is not limited to what is described above and the driving state switching unit 16 may maintain the manual driving state during, for example, a period determined in advance. In addition, any other known input other than the autonomous driving ON/OFF switch 70 can be used for the input of the autonomous driving initiation request operation.

As described above with reference to FIG. 3, a transition between the autonomous driving state and the cooperative driving state is determined based on a comparison between the intervention determination threshold Tk and the operation amount T based on the driving operation and is a reversible transition as indicated by the double pointed arrow in FIG. 3. A transition between the cooperative driving state and the manual driving state, in contrast, is an irreversible transition, in which only a transition from the cooperative driving state to the manual driving state is allowed, as indicated by the single pointed arrow in FIG. 3. The driving state switching unit 16 outputs information related to the driving state to the traveling control unit 17.

In a case where the driving state of the vehicle V can be switched based on the operation amounts T of at least two of the steering operation, the accelerator operation, and the brake operation, the vehicle system 100 may give priority to the maintenance of a high-priority driving state or switching to the high-priority driving state. For example, the vehicle system 100 may put the cooperative driving state before the autonomous driving state and may put the manual driving state before the cooperative driving state. Specifically, the vehicle system 100 may switch the driving state of the vehicle V to the cooperative driving state, even when the operation amounts T of any two of the steering operation, the accelerator operation, and the brake operation are less than the intervention determination threshold Tk, in a case where, for example, the driving state of the vehicle V is the autonomous driving state and the operation amount T of the other one becomes equal to or greater than the intervention determination threshold Tk and less than the manual driving initiation threshold Th. In addition, the vehicle system 100 may maintain the cooperative driving state, even when the operation amounts T of any two of the steering operation, the accelerator operation, and the brake operation are reduced to become less than the intervention determination threshold Tk, in a case where, for example, the driving state of the vehicle V is the cooperative driving state and the operation amount T of the other one is equal to or greater than the intervention determination threshold Tk and less than the manual driving initiation threshold Th. The vehicle system 100 may switch the driving state of the vehicle V to the manual driving state, even when the operation amounts T of any two of the steering operation, the accelerator operation, and the brake operation are equal to or greater than the intervention determination threshold Tk and less than the manual driving initiation threshold Th, in a case where, for example, the driving state of the vehicle V is the cooperative driving state and the operation amount T of the other one is equal to or greater than the manual driving initiation threshold Th.

Referring to FIGS. 1 and 2, the traveling control unit 17 of the ECU 10 allows the vehicle V to travel in the driving state that is determined by the driving state switching unit 16. When the driving state of the vehicle V is the autonomous driving state, the traveling control unit 17 outputs a control signal to the actuator 6 and controls the traveling of the vehicle V based on the traveling plan that is generated by the traveling plan generating unit 14. When the driving state of the vehicle V is the cooperative driving state, the traveling control unit 17 outputs a control signal to the actuator 6 and works in tandem with the driving operation for the traveling of the vehicle V based on the traveling plan that is generated by the traveling plan generating unit 14 and the operation amount T that is acquired by the driving operation information acquisition unit 15. When the driving state of the vehicle V is the manual driving state, the traveling control unit 17 outputs a control signal based on the operation amount T that is acquired by the driving operation information acquisition unit 15 to the actuator 6 and reflects the operation amount T of the driving operation in the traveling of the vehicle V. In this manner, the traveling control unit 17 realizes three states; the autonomous driving state, the cooperative driving state, and the manual driving state.

The information output unit 18 transfers information on the vehicle V and information on a peripheral situation regarding the vehicle V to the passenger by, for example, transmitting a control signal to the HMI 7 (display 7a and audio output 7b). The information output unit 18 displays the state of the operation amount T with respect to the intervention determination threshold Tk and/or the manual driving initiation threshold Th by transmitting the control signal to the display unit 7a. The information output unit 18 displays the state of the operation amount T with respect to the intervention determination threshold Tk and/or the manual driving initiation threshold Th.

The information output unit 18 causes the display 7a to display the state of the operation amount T with respect to the intervention determination threshold Tk and the manual driving initiation threshold Th in a case where, for example, the driving state of the vehicle is the autonomous driving state or the cooperative driving state and the operation that is used for driving state switching among the steering operation, the accelerator operation, and the brake operation is performed by the driver. In other words, the information output unit 18 may not cause the display 7a to display the state of the operation amount T with respect to the intervention determination threshold Tk and the manual driving initiation threshold Th in a case where the driving state of the vehicle is the manual driving state. When the autonomous driving ON/OFF switch 70 is ON and the operation amount T is equal to or greater than the manual driving initiation threshold Th, the information output unit 18 may display the state of the operation amount T with respect to the intervention determination threshold Tk and the manual driving initiation threshold Th even in a case where the driving state of the vehicle is the manual driving state. Then, the driver can recognize that the driving state of the vehicle is not switched from the manual driving state to the autonomous driving state, although the autonomous driving ON/OFF switch 70 is ON, since the operation amount T is equal to or greater than the manual driving initiation threshold Th. In addition, the driver can recognize how much to decrease the operation amount T so as to switch the driving state of the vehicle from the manual driving state to the autonomous driving state or the cooperative driving state. In addition, the information output unit 18 may notify the driver, by an audio output, a warning output, a light output, and the like, that the driving state of the vehicle is not switched to the autonomous driving state because of a large operation amount in a case where the operation amount T is equal to or greater than the manual driving initiation threshold Th and the autonomous driving ON/OFF switch 70 is ON. The vehicle system 100 may switch the driving state of the vehicle to the autonomous driving state regardless of the current operation amount T in a case where the autonomous driving ON/OFF switch 70 is switched ON.

The information output unit 18 may cause the display 7a to display the state of the operation amount T with respect to the intervention determination threshold Tk and/or the manual driving initiation threshold Th at all times regardless of the driving state. The information output unit 18 may cause the display 7a to display only the operation amount T of the operation that the driver is engaged in among the steering operation, the accelerator operation, and the brake operation.

Hereinafter, examples of the display of the state of the operation amount T with respect to the intervention determination threshold Tk and the manual driving initiation threshold Th will be described with reference to FIGS. 4A to 4D. Display examples as indicator bars are illustrated in FIGS. 4A to 4D. The display examples in FIGS. 4A to 4D can be adopted with regard to any of the steering operation, the accelerator operation, and the brake operation. Of course more than one of these options may be displayed at a time, but using more than one indicator bar, more than one color, and the like.

Figure 4A:
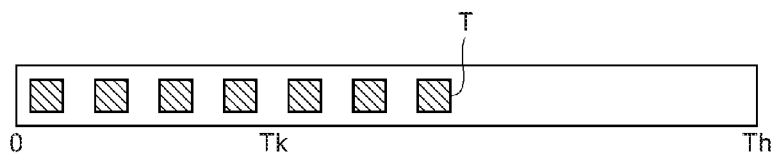
FIGS. 4A to 4D are diagrams each illustrating a display example as an indicator bar regarding the state of the operation amount with respect to an intervention determination threshold and a manual driving initiation threshold.

FIG. 4A is a diagram illustrating the display example of the indicator bar pertaining to a case where the intervention determination threshold Tk and the manual driving initiation threshold Th are fixed. In the indicator bar that is illustrated in FIG. 4A, only the operation amount T of the driver's operation varies. According to the indicator bar that is illustrated in FIG. 4A, the driving state of the vehicle is switched from the autonomous driving state to the cooperative driving state when the operation amount T exceeds the intervention determination threshold Tk. According to the indicator bar that is illustrated in FIG. 4A, the driving state of the vehicle is switched from the cooperative driving state to the manual driving state when the operation amount T exceeds the manual driving initiation threshold Th. In a case where at least two of the operation amount T of the steering operation, the operation amount T of the accelerator operation, and the operation amount T of the brake operation are used for the driving state switching, the information output unit 18 may display the two or more indicator bars correlated with the respective operation amounts T. In FIG. 4A, the manual driving initiation threshold Th does not necessarily have to be at the right end (maximum value) of the indicator bar.

Figure 4B:
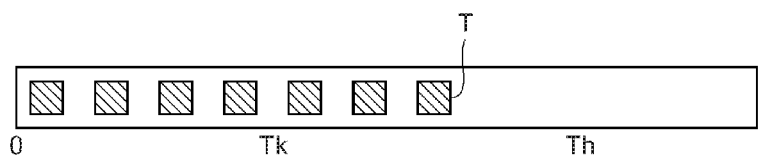

FIG. 4B is a diagram illustrating the example of the indicator bar pertaining to a case where the intervention determination threshold Tk and the manual driving initiation threshold Th vary. In other words, the intervention determination threshold Tk and the manual driving initiation threshold Th may vary. In addition, any one of the intervention determination threshold Tk and the manual driving initiation threshold Th may vary while the other one does not vary. In the indicator bar that is illustrated in FIG. 4B, the positions of the intervention determination threshold Tk and the manual driving initiation threshold Th as well as the operation amount T vary.

Figure 4C:
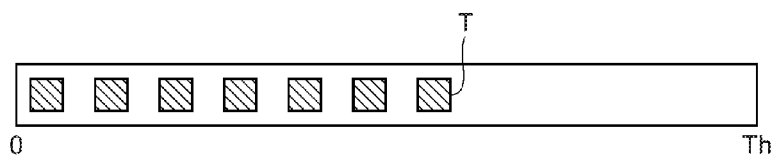
Figure 4D:
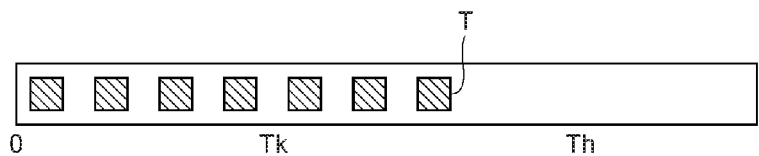

The vehicle system 100 does not have to be capable of switching the driving state of the vehicle to and from the autonomous driving state, the cooperative driving state, and the manual driving state. In other words, the vehicle control state is not limited to a case where both the autonomous driving state and the cooperative driving state are included and may include at least one of the autonomous driving state and the cooperative driving state. The vehicle system 100 may be capable of switching the driving state of the vehicle between, for example, only the two driving states of the autonomous driving state and the manual driving state. In this case, the vehicle control state described above corresponds to the autonomous driving state. In this case, the information output unit 18 does not have to display the intervention determination threshold Tk and displays only the state of the operation amount T with respect to the manual driving initiation threshold Th. FIG. 4C is a diagram illustrating the example of the indicator bar in which the manual driving initiation threshold Th is fixed. In FIG. 4C, only the operation amount T of the driver's operation varies. According to the indicator bar that is illustrated in FIG. 4C, the driving state of the vehicle is switched from the autonomous driving state to the manual driving state when the operation amount T exceeds the manual driving initiation threshold Th. In FIG. 4C, the manual driving initiation threshold Th does not necessarily have to be at the right end (maximum value) of the indicator bar. FIG. 4D is a diagram illustrating the example of the indicator bar pertaining to a case where the manual driving initiation threshold Th varies. According to the indicator bar that is illustrated in FIG. 4D, the position of the manual driving initiation threshold Th as well as the operation amount T varies.

The vehicle system 100 may also be a system that is capable of switching the driving state of the vehicle only between the two driving states of the cooperative driving state and the manual driving state. In this case, the vehicle control state described above corresponds to the cooperative driving state. Since only one threshold is used for the driving state switching in this case, the display example that is illustrated in FIG. 4C or FIG. 4D can be adopted. Even in a case where the driving state of the vehicle can be switched to and from the autonomous driving state, the cooperative driving state, and the manual driving state, the vehicle system 100 may display only the state of the operation amount T with respect to the manual driving initiation threshold Th as illustrated in FIG. 4C or FIG. 4D without displaying the intervention determination threshold Tk.

Even when the vehicle system 100 is a system that is capable of switching the driving state of the vehicle to and from the three driving states, the vehicle system 100 may display only the manual driving initiation threshold Th and hide the display of the intervention determination threshold Tk so as to facilitate the visualization of the display when the operation amount T is equal to the intervention determination threshold Tk in the indicator bar which is illustrated in FIG. 4A or FIG. 4B. In a case where the vehicle system 100 is a system that is capable of switching the driving state of the vehicle to and from the three driving states and the operation amount T exceeds the manual driving initiation threshold Th in the indicator bar which is illustrated in FIG. 4A or FIG. 4B, the vehicle system 100 may display only the manual driving initiation threshold Th and hide the display of the intervention determination threshold Tk so as to facilitate the visualization of the display.

The vehicle system 100 may also be a system that is capable of switching the driving state of the vehicle to four or more driving states in accordance with the operation amount T of the driver's operation. In this case, the information output unit 18 displays, for example, the state of the operation amount T with respect to three or more thresholds.

Hereinafter, display examples regarding the operation amount of the steering operation will be described with reference to FIG. 5. FIG. 5 is a diagram illustrating the display examples regarding the state of the operation amount of the steering operation with respect to the intervention determination threshold Tk and the manual driving initiation threshold Th. FIG. 5 shows first to fifth display examples pertaining to a case where a steering wheel ST is at a reference position (initial position) and a case where the steering wheel ST is at a rotation position after counterclockwise rotation. In a case where the steering wheel ST is at the reference position, the intervention determination threshold Tk and/or the manual driving initiation threshold Th may be displayed or none of the intervention determination threshold Tk and the manual driving initiation threshold Th may be displayed. In a case where the steering wheel ST is at the reference position and the intervention determination threshold Tk and/or the manual driving initiation threshold Th are/is displayed, both of those for counterclockwise rotation and clockwise rotation can be displayed.

In a case where the steering wheel ST rotates in accordance with the direction of the vehicle V in the autonomous driving state, the reference position of the steering wheel ST may be the position of the steering control target value (steering angle) according to the traveling plan for the vehicle V in the autonomous driving state. In this case, the vehicle system 100 displays, for example, the difference between the steering rotation state detection value regarding the vehicle V that is detected by the steering sensor and the steering control target value that is included in the traveling plan which is generated by the traveling plan generating unit 14 as the operation amount of the steering operation.

The first display example is an example pertaining to a case where the steering wheel ST is illustrated in an abstract representation. In the first display example, a bar Ha at the center of the steering wheel according to the abstract representation rotates in accordance with the angle of the steering wheel ST. In other words, the rotation angle of the bar Ha is correlated with the operation amount of the steering operation. In the first display example, the driving state of the vehicle is switched from the autonomous driving state to the cooperative driving state when the bar Ha rotates in excess of the intervention determination threshold Tk. Likewise, the driving state of the vehicle is switched from the cooperative driving state to the manual driving state when the bar Ha rotates in excess of the manual driving initiation threshold Th.

The intervention determination threshold Tk and the manual driving initiation threshold Th pertaining to the case of counterclockwise rotation is illustrated herein as the first display example regarding the rotation of the steering wheel ST. In the case of clockwise rotation, however, the intervention determination threshold Tk and the manual driving initiation threshold Th for counterclockwise rotation are hidden and the intervention determination threshold Tk and the manual driving initiation threshold Th for clockwise rotation are displayed. In addition, the bar Ha may rotate in accordance with the direction of the vehicle V in the autonomous driving state in a case where the steering wheel ST rotates in accordance with the direction of the vehicle V in the autonomous driving state. In this case, the display of the intervention determination threshold Tk and the manual driving initiation threshold Th also rotates in accordance with the direction of the vehicle V in the autonomous driving state. When the driver's steering operation is performed in this case, only the bar Ha rotates in accordance with the operation amount of the steering operation. In this regard, the first display example is identical to the second display example (described later).

As is the case with the first display example, the second display example is an example pertaining to a case where the steering wheel ST is illustrated in an abstract representation. In the second display example, the intervention determination threshold Tk and the manual driving initiation threshold Th of the first display example are regionally illustrated. In other words, the current bar Ha and the regions up to the intervention determination threshold Tk or the manual driving initiation threshold Th are illustrated by the use of a color different than that of the background.

The third display example is an example pertaining to a case where the operation amount of the steering wheel ST is illustrated by the use of a meter. In the third display example, the slope of a meter bar Hb corresponds to the operation amount of the driver's steering operation. In the third display example, the meter bar Hb points directly above in a case where the steering wheel ST is at the reference position and the meter bar Hb tilts to the right or to the left in accordance with the rotation of the steering wheel ST. For example, the intervention determination threshold Tk and the manual driving initiation threshold Th for counterclockwise rotation and the intervention determination threshold Tk and the manual driving initiation threshold Th for clockwise rotation are shown in the third display example. The meter bar Hb may tilt to the right or to the left in accordance with the direction of the vehicle V in the autonomous driving state in a case where the steering wheel ST rotates in accordance with the direction of the vehicle V in the autonomous driving state. In this case, the display of the intervention determination threshold Tk and the manual driving initiation threshold Th also rotates in accordance with the direction of the vehicle V in the autonomous driving state. When the driver's steering operation is performed in this case, only the meter bar Hb tilts to the right or to the left in accordance with the operation amount of the steering operation.

The fourth display example is an example pertaining to a case where the operation amount of the steering wheel ST is illustrated by the use of a slide bar. In the fourth display example, the position of a bar Hc corresponds to the operation amount of the driver's steering operation. In the fourth display example, the bar Hc is positioned at the center in a case where the steering wheel ST is at the reference position and the bar Hc slides to the right or to the left in accordance with the direction in which the steering wheel ST rotates. For example, the intervention determination threshold Tk and the manual driving initiation threshold Th for counterclockwise rotation and the intervention determination threshold Tk and the manual driving initiation threshold Th for clockwise rotation are shown in the fourth display example. The bar Hc may slide to the right or to the left in accordance with the direction of the vehicle V in the autonomous driving state in a case where the steering wheel ST rotates in accordance with the direction of the vehicle V in the autonomous driving state. In this case, the display positions of the intervention determination threshold Tk and the manual driving initiation threshold Th are also moved to the right or to the left in accordance with the direction of the vehicle V in the autonomous driving state. When the driver's steering operation is performed in this case, only the bar Hc slides in accordance with the operation amount of the steering operation.

The fifth display example is an example pertaining to a case where the operation amount of the steering wheel ST is illustrated by the use of numerical values. In the fifth display example, the operation amount of the steering wheel ST (such as the steering angle) is shown in the form of numerical values. In the fifth display example, the intervention determination threshold Tk and the manual driving initiation threshold Th for counterclockwise rotation are displayed as numerical values in a case where, for example, the steering wheel ST rotates counterclockwise. Likewise, in the fifth display example, the intervention determination threshold Tk and the manual driving initiation threshold Th for clockwise rotation are displayed as numerical values in a case where, for example, the steering wheel ST rotates clockwise. The numerical value of the steering angle may vary in accordance with the direction of the vehicle V in the autonomous driving state in a case where the steering wheel ST rotates in accordance with the direction of the vehicle V in the autonomous driving state. In this case, the numerical values of the intervention determination threshold Tk and the manual driving initiation threshold Th also vary in accordance with the direction of the vehicle V in the autonomous driving state. When the driver's steering operation is performed in this case, only the bar Hc slides in accordance with the operation amount of the steering operation.

The steering wheel ST may also be realistically represented (for example, represented in the form of the state of the steering wheel illustrated in FIG. 5) and the color or brightness may be changed as the operation amount becomes close to the intervention determination threshold Tk or the manual driving initiation threshold Th. In addition, the steering wheel ST may be realistically represented and the steering wheel ST in a state where the operation amount reaches the intervention determination threshold Tk and the steering wheel ST in a state where the operation amount reaches the manual driving initiation threshold Th may be displayed in the background of the display of the current steering wheel ST. In addition, the intervention determination threshold Tk and/or the manual driving initiation threshold Th may be moved, as in FIG. 4B and FIG. 4D, in the first to fifth display examples.

In the first to fifth display examples, both the intervention determination threshold Tk and the manual driving initiation threshold Th are displayed. However, only one of the intervention determination threshold Tk and the manual driving initiation threshold Th may be displayed instead. For example, only the intervention determination threshold Tk may be displayed while the manual driving initiation threshold Th is not displayed until the operation amount T reaches the intervention determination threshold Tk. In addition, only the manual driving initiation threshold Th may be displayed while the intervention determination threshold Tk is not displayed in a case where the operation amount T exceeds the manual driving initiation threshold Th.

In the first to fifth display examples, one of the intervention determination threshold Tk and the manual driving initiation threshold Th may not be displayed while the other one is highlighted. For example, the intervention determination threshold Tk may be highlighted with the brightness increased or the color changed and with the display of the manual driving initiation threshold Th not changed until the operation amount T reaches the intervention determination threshold Tk. Likewise, in the first to fifth display examples, the display of the manual driving initiation threshold Th may be highlighted with the brightness increased or the color changed and with the display of the intervention determination threshold Tk not changed in a case where the operation amount T exceeds the manual driving initiation threshold Th. In addition, one of the intervention determination threshold Tk and the manual driving initiation threshold Th may be highlighted with the other one not displayed.

Figure 6:
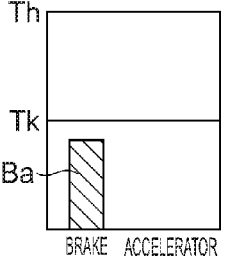
FIG. 6 is a flowchart showing an example of switching processing for switching a driving state from an autonomous driving state or a cooperative driving state by using the operation amount of a driving operation.

Hereinafter, other display examples regarding the operation amount of the accelerator operation and the operation amount of the brake operation will be described with reference to FIG. 6. FIG. 6 is a diagram illustrating display examples A to E regarding the states of the operation amount of the accelerator operation and the operation amount of the brake operation with respect to the intervention determination threshold Tk and the manual driving initiation threshold Th. In a case where the accelerator pedal and the brake pedal are at reference positions (initial positions), the intervention determination threshold Tk and/or the manual driving initiation threshold Th may be displayed or none of the intervention determination threshold Tk and the manual driving initiation threshold Th may be displayed.

Display example A is a diagram illustrating an example in which the operation amount of the brake operation and the operation amount of the accelerator operation are shown by the use of bar graphs. In display example A, a bar Ba represents the operation amount of the brake operation and a bar Aa represents the operation amount of the accelerator operation. In display example A, the bar Ba extends upward as the operation amount of the brake operation increases and the bar Aa extends upward as the operation amount of the accelerator operation increases. In a case where the driving state of the vehicle V is the autonomous driving state, the vehicle system 100 switches the driving state of the vehicle V to the cooperative driving state when the bar Ba representing the operation amount of the brake operation or the bar Aa representing the operation amount of the accelerator operation becomes equal to or greater than the intervention determination threshold Tk. In a case where the driving state of the vehicle V is the cooperative driving state, the vehicle system 100 switches the driving state of the vehicle V to the manual driving state when the bar Ba representing the operation amount of the brake operation or the bar Aa representing the operation amount of the accelerator operation becomes equal to or greater than the manual driving initiation threshold Th.

The information output unit 18 may cause the display 7a to display for the operation amount to gradually decrease, instead of immediately decreasing the operation amount to zero, even when the driver takes his or her foot off the brake pedal or the accelerator pedal. Both the bar Ba and the bar Aa may be displayed in display example A when, for example, the driver moves his or her foot from the accelerator pedal to the brake pedal in this case.

Display example B is a diagram illustrating an example in which the operation amount of the brake operation and the operation amount of the accelerator operation are shown by the use of block-type bar graphs. In display example B, a block Bb represents the operation amount of the brake operation and a block Ab represents the operation amount of the accelerator operation. In display example B, the block Bb piles up as the operation amount of the brake operation increases and the block Ab piles up as the operation amount of the accelerator operation increases.

Display example C is a diagram illustrating an example in which the operation amount of the brake operation and the operation amount of the accelerator operation are shown by the use of the sizes of circles. In display example C, a circle Bc represents the operation amount of the brake operation and a circle Ac represents the operation amount of the accelerator operation. In display example C, the brake and the accelerator are shown by the use of different circles. The circle Bc and the circle Ac may have different colors as well. In display example C, the circle Bc increases in size as the operation amount of the brake operation increases and the circle Ac increases in size as the operation amount of the accelerator operation increases. Each of the intervention determination threshold Tk and the manual driving initiation threshold Th is shown as a circle that has a constant size.

Display example D is a diagram illustrating an example in which the operation amount of the brake operation and the operation amount of the accelerator operation are shown by the use of the sizes of semicircles. In display example D, a semicircle Bd represents the operation amount of the brake operation and a semicircle Ad represents the operation amount of the accelerator operation. In display example D, the operation amount of the accelerator operation and the operation amount of the brake operation can be shown by the use of a single circle. The semicircle Bd and the semicircle Ad may have different colors as well. In display example D, the semicircle Bd increases in size as the operation amount of the brake operation increases and the semicircle Ad increases in size as the operation amount of the accelerator operation increases. Each of the intervention determination threshold Tk and the manual driving initiation threshold Th is shown as a circle that has a constant size. Display example D shows both the operation amount of the accelerator operation and the operation amount of the brake operation by the use of a common concentric circle (concentric circle of the Tk circle and the Th circle). However, the operation amount of the accelerator operation and the operation amount of the brake operation may also be displayed by the use of separate concentric circles and in a state where the operation amount of the accelerator operation and the operation amount of the brake operation are separated from each other.

Display example E is a diagram illustrating an example in which the operation amount of the brake operation and the operation amount of the accelerator operation are shown by the use of pie charts. In display example E, a fan-shaped region Be represents the operation amount of the brake operation and a fan-shaped region Ae represents the operation amount of the accelerator operation. In display example E, the operation amount of the accelerator operation and the operation amount of the brake operation can be shown by the use of a single circle. The region Be and the region Ae may have different colors as well. In display example E, the ratio of the region Be to the circle increases as the operation amount of the brake operation increases and the ratio of the region Ae to the circle increases as the operation amount of the accelerator operation increases. Each of the intervention determination threshold Tk and the manual driving initiation threshold Th is shown as the boundary lines of a region that has a constant ratio to the circle.

In addition, the information output unit 18 may cause the display 7a to display, on a color or brightness basis, that the operation amount of the brake operation or the operation amount of the accelerator operation becomes close to the intervention determination threshold Tk. In addition, the information output unit 18 may cause the display 7a to display the state of the operation amount of the brake operation with respect to the intervention determination threshold Tk and the manual driving initiation threshold Th and the state of the operation amount of the accelerator operation with respect to the intervention determination threshold Tk and the manual driving initiation threshold Th in the form of sLIDARs on slide bars. In this case, the slide bar regarding the brake operation and the slide bar regarding the accelerator operation may be connected to each other to form a single axis.

Both the operation amount of the accelerator operation and the operation amount of the brake operation can be displayed in display example A, display example B, display example D, and display example E. However, the operation amount of the accelerator operation and the operation amount of the brake operation may also be displayed separately. In a case where the operation amount of the accelerator operation and the operation amount of the brake operation are displayed separately, only the operation amount of one of the accelerator operation and the brake operation that is in progress may be displayed. In addition, the intervention determination threshold Tk and the manual driving initiation threshold Th may be moved, as in FIG. 4B and FIG. 4D, in display examples A to E. Display examples A to E may also be used in displaying the operation amount of the steering operation as well as the operation amount of the accelerator operation and the operation amount of the brake operation.

The display of the state of the operation amount T with respect to the intervention determination threshold Tk and the manual driving initiation threshold Th has been described above. The display examples, however, are not limited to what is described above. For example, the information output unit 18 may change the size of the information displayed by the display 7*a*. In this case, the displayed information can be enlarged when the operation amount T becomes close to the intervention determination threshold Tk or the manual driving initiation threshold Th. In addition, the information output unit 18 may cause the display 7*a* to three-dimensionally display the bar graphs, the pie charts, or the like of display examples A to E.

In a case where the display unit 7*a* has only one display frame (or display space) on the screen where the operation amount T is displayed, the information output unit 18 may cause the display 7*a* to display, on the display frame, the operation amount of the operation that the driver is engaged in among the operation amount of the steering operation, the operation amount of the accelerator operation, and the operation amount of the brake operation. The information output unit 18 switches the display on the display frame from any one of the first to fifth display examples illustrated in FIG. 5 to any one of display examples A to E illustrated in FIG. 6 in a case where, for example, the driver stops the steering operation and performs the accelerator operation (or the brake operation). The operation amount of the accelerator operation and the operation amount of the brake operation can also be simultaneously displayed on the same display frame as illustrated in display example A, display example B, display example D, and display example E in FIG. 6.

The information output unit 18 gives priority to one of the operation amount of the steering operation and the operation amount of the brake operation that has a higher operation amount ratio to the intervention determination threshold Tk in performing the display on the display frame in a case where, for example, only one display frame is provided on the screen where the operation amount T is displayed and the driver simultaneously performs the steering operation with the accelerator operation (or the brake operation). The information output unit 18 may give priority to the operation amount that has a higher ratio to the manual driving initiation threshold Th in performing the display on the display frame. In a case where only one of the operation amount of the steering operation, the operation amount of the accelerator operation, and the operation amount of the brake operation exceeds the intervention determination threshold Tk, the information output unit 18 may give priority to that operation amount in performing the display on the display frame. In a case where only one of the operation amount of the steering operation, the operation amount of the accelerator operation, and the operation amount of the brake operation exceeds the manual driving initiation threshold Th, the information output unit 18 may give priority to that operation amount in performing the display on the display frame. The information output unit 18 may display the operation amount that is the closest to a threshold for switching the current driving state among the operation amount of the steering operation, the operation amount of the accelerator operation, and the operation amount of the brake operation.

Figure 7A:
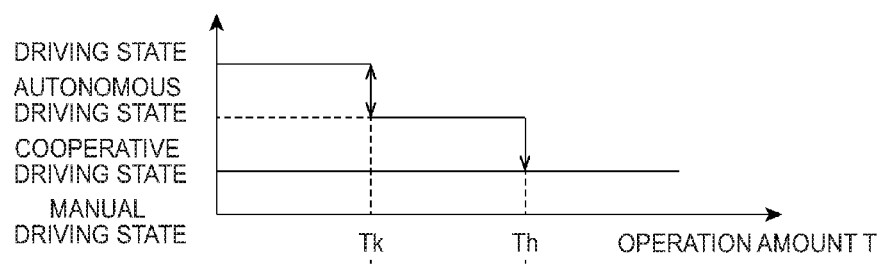
FIGS. 7A to 7C are diagrams showing an example of a relationship of the operation amount to the driving state transition, current driving state notification ON/OFF, and an operation resistance, respectively.
Figure 7B:
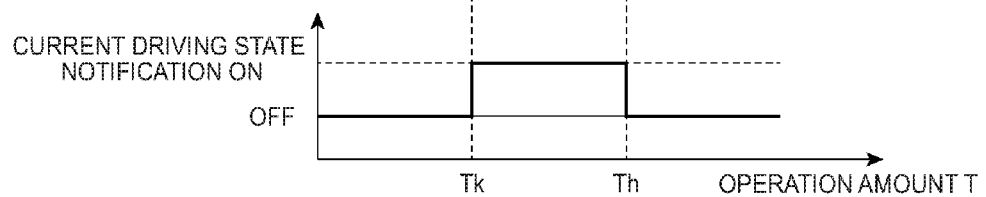

The information output unit 18 may cause the display 7*a* to display the current driving state to the driver. FIG. 7A is a diagram showing an example of a relationship between the operation amount T and a driving state transition. FIG. 7B is a diagram showing an example of a relationship between current driving state notification ON/OFF and the operation amount T. According to FIG. 7B, the current driving state notification is ON only in the case of the cooperative driving state. The information output unit 18 displays the cooperative driving state (current driving state) in the display unit 7*a* in a case where, for example, the current driving state notification is ON. As illustrated in FIGS. 7A and 7B, the information output unit 18 may switch the current driving state notification ON/OFF in accordance with the operation amount T. In addition, the information output unit 18 may display the autonomous driving state or the manual driving state to the driver.

Figure 7C:
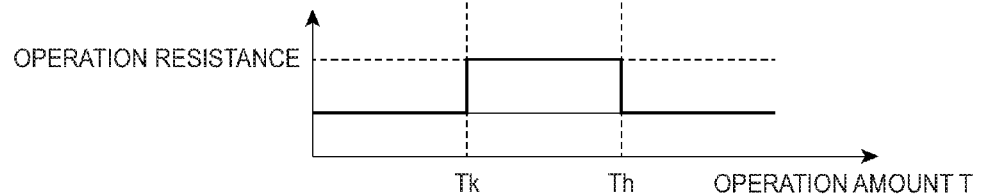

FIG. 7C is a diagram showing an example of a relationship between an operation resistance and the operation amount T. As illustrated in FIGS. 7A and 7C, the vehicle system 100 may increase the operation resistance as a way of notifying the driver of the cooperative driving state. The operation resistance is the resistance of the steering operation, the brake operation, or the accelerator operation related to the operation amount T with respect to the driver. The vehicle system 100 makes the driver's driving operation less likely to be performed in a case where, for example, the operation resistance is increased than in a case where the operation resistance is not increased (than in the case of a standard operation resistance). A change in the operation resistance is executed when, for example, the traveling control unit 17 outputs a control signal to the actuator 6. Specifically, the vehicle system 100 changes the operation resistance of the steering operation by controlling the assist motor, which controls the steering torque in the electric power steering system, with the control signal output from the traveling control unit 17.

During the driving state switching, the information output unit 18 may perform pre-migration notification and post-migration notification based on the audio output from the audio output 7*b*. In addition, the information output unit 18 may perform the pre-migration notification and the post-migration notification based on the display in the display 7*a*. The pre-migration notification is, for example, to notify the driver of the initiation of a driving state transition (migration). The post-migration notification is, for example, to notify the driver of the completion of the driving state transition (migration).

Figure 8A:
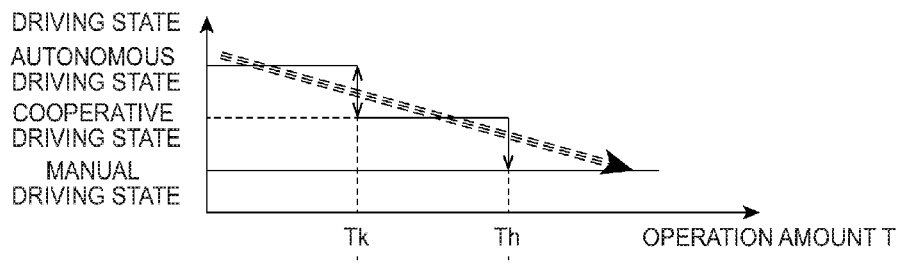
FIGS. 8A to 8D are diagrams showing an example of a relationship of an increase in the operation amount to the driving state transition, post-migration notification ON/OFF, pre-migration notification ON/OFF, and the operation resistance, respectively.

FIG. 8A is a diagram showing an example of a driving state transition attributable to an increase in the operation amount T. As illustrated in FIG. 8A, the vehicle system 100 is subjected to a transition from the autonomous driving state to the cooperative driving state and from the cooperative driving state to the manual driving state as a result of an increase in the operation amount T. The information output unit 18 turns ON the post-migration notification in a case where, for example, the operation amount T increases and reaches the intervention determination threshold Tk. The information output unit 18 turns OFF the post-migration notification a predetermined period of time after the initiation of the post-migration notification.

Figure 8B:
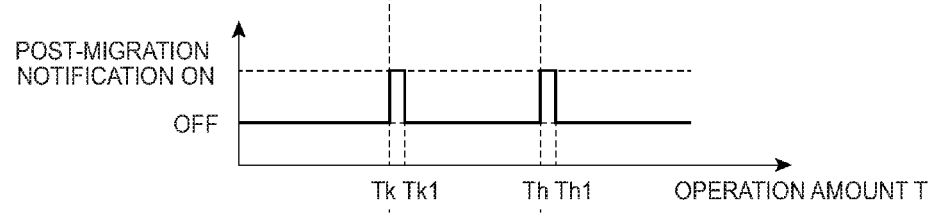

The information output unit 18 may turn OFF the post-migration notification in accordance with an increase in the operation amount T. FIG. 8B is a diagram showing an example of a relationship between an increase in the operation amount T and post-migration notification ON/OFF. As illustrated in FIGS. 8A and 8B, the information output unit 18 may perform the post-migration notification regarding the cooperative driving state until the operation amount T reaches a set value Tk1 after increasing to reach the intervention determination threshold Tk. In other words, the information output unit 18 may turn ON the post-migration notification in a case where the operation amount T increases and reaches the intervention determination threshold Tk and may turn OFF the post-migration notification in a case where the operation amount T continues to increase to reach the set value Tk1. Likewise, the information output unit 18 may perform the post-migration notification regarding the manual driving state until the operation amount T reaches a set value Th1 after increasing to reach the manual driving initiation threshold Th. The set value Tk1 is any value that exceeds the intervention determination threshold Tk and is less than the manual driving initiation threshold Th. The set value Th1 is any value that exceeds the manual driving initiation threshold Th.

The information output unit 18 turns ON the pre-migration notification in a case where, for example, the operation amount T increases and reaches a set value Th0. The set value Th0 is any value that is less than the manual driving initiation threshold Th and exceeds the intervention determination threshold Tk. The information output unit 18 turns OFF the pre-migration notification a predetermined period of time after the initiation of the pre-migration notification.

Figure 8C:
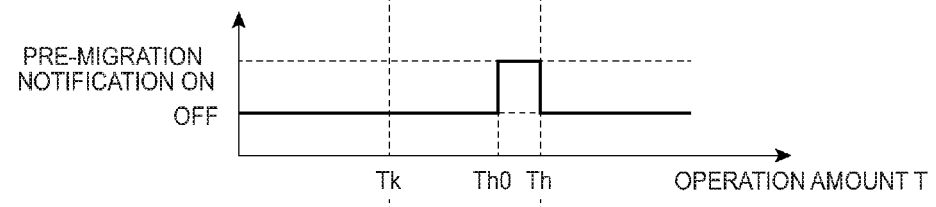

The information output unit 18 may turn OFF the pre-migration notification in accordance with an increase in the operation amount T. FIG. 8C is a diagram showing an example of a relationship between an increase in the operation amount T and pre-migration notification ON/OFF. As illustrated in FIG. 8C, the information output unit 18 may perform the pre-migration notification regarding the manual driving state until the operation amount T reaches the manual driving initiation threshold Th after increasing to reach the set value Th0. Both of the post-migration notification and the pre-migration notification do not necessarily have to be performed with each other and only one of the post-migration notification and the pre-migration notification may be performed. This is applied as it is to the following description.

Figure 8D:
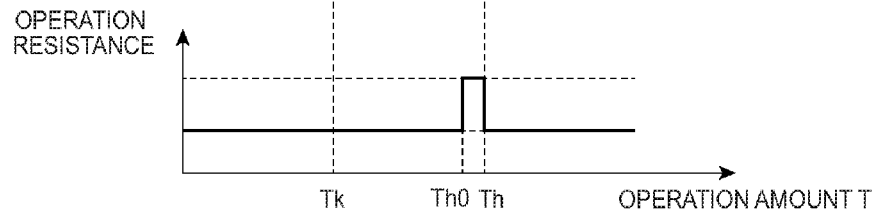

FIG. 8D is a diagram showing an example of a relationship between an increase in the operation amount T and the operation resistance. As illustrated in FIG. 8D, the vehicle system 100 may increase the operation resistance until the operation amount T reaches the manual driving initiation threshold Th after increasing to reach the set value Th0.

Figure 9A:
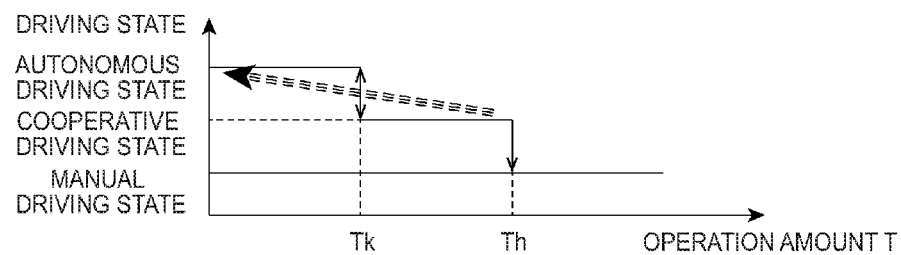
FIGS. 9A to 9D are diagrams showing an example of a relationship of a decrease in the operation amount to the driving state transition, the post-migration notification ON/OFF, the pre-migration notification ON/OFF, and the operation resistance, respectively.

FIG. 9A is a diagram showing an example of a driving state transition attributable to a decrease in the operation amount T. As illustrated in FIG. 9A, the vehicle system 100 is subjected to a transition from the cooperative driving state to the autonomous driving state as a result of a decrease in the operation amount T. The information output unit 18 turns ON the post-migration notification in a case where, for example, the operation amount T decreases and becomes less than the intervention determination threshold Tk. The information output unit 18 turns OFF the post-migration notification a predetermined period of time after the initiation of the post-migration notification.

Figure 9B:
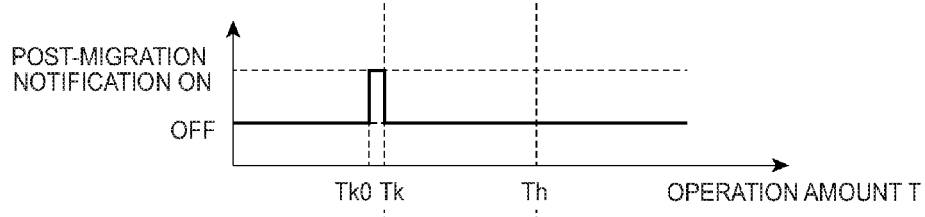

The information output unit 18 may turn OFF the post-migration notification in accordance with a decrease in the operation amount T. FIG. 9B is a diagram showing an example of a relationship between a decrease in the operation amount T and post-migration notification ON/OFF. As illustrated in FIGS. 9A and 9B, the information output unit 18 may perform the post-migration notification regarding the autonomous driving state until the operation amount T becomes less than a set value Tk0 after decreasing to become less than the intervention determination threshold Tk in a case where the driving state of the vehicle V is the cooperative driving state. In other words, the information output unit 18 may turn ON the post-migration notification in a case where the operation amount T decreases and becomes less than the intervention determination threshold Tk and may turn OFF the post-migration notification in a case where the operation amount T continues to decrease to become less than the set value Tk0. The set value Tk0 is any value that is less than the intervention determination threshold Tk.

The information output unit 18 turns ON the pre-migration notification in a case where, for example, the operation amount T decreases and becomes less than a set value Tk2. The set value Tk2 is any value that exceeds the intervention determination threshold Tk and is less than the manual driving initiation threshold Th. The information output unit 18 turns OFF the pre-migration notification a predetermined period of time after the initiation of the pre-migration notification.

Figure 9C:
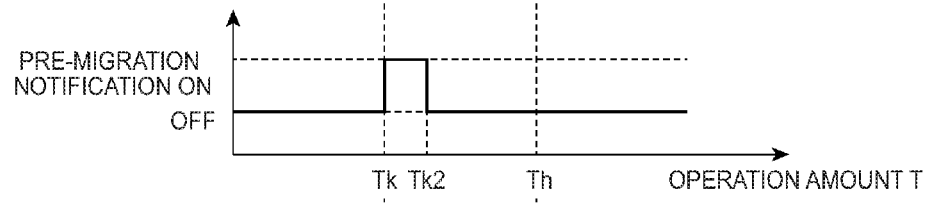

The information output unit 18 may turn OFF the pre-migration notification in accordance with a decrease in the operation amount T. FIG. 9C is a diagram showing an example of a relationship between a decrease in the operation amount T and pre-migration notification ON/OFF. As illustrated in FIG. 9C, the information output unit 18 may perform the pre-migration notification regarding the autonomous driving state until the operation amount T becomes less than the intervention determination threshold Tk after decreasing to become less than the set value Tk2 in a case where the driving state of the vehicle V is the cooperative driving state.

Figure 9D:
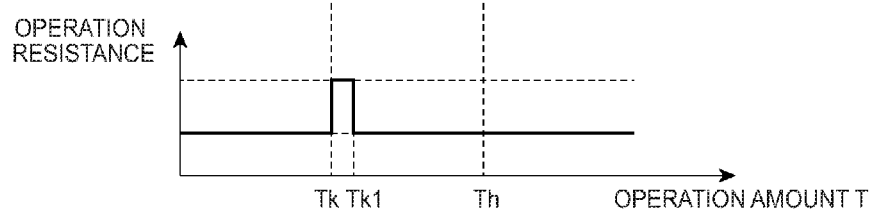

FIG. 9D is a diagram showing an example of a relationship between a decrease in the operation amount T and the operation resistance. As illustrated in FIG. 9D, the vehicle system 100 may increase the operation resistance until the operation amount T becomes less than the intervention determination threshold Tk after decreasing to become less than the set value Tk1 in a case where the driving state of the vehicle V is the cooperative driving state.

Figure 10:
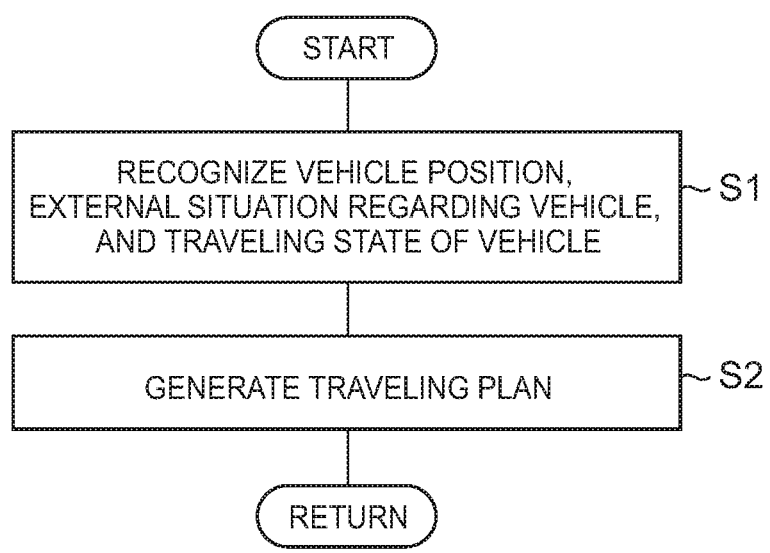
FIG. 10 is a flowchart showing an example of the traveling plan generating processing.

Hereinafter, processing that is performed by the vehicle system 100 will be described. FIG. 10 is a flowchart showing an example of traveling plan generating processing. The control processing that is illustrated in FIG. 10 is executed when, for example, the autonomous driving initiation request operation is input into the autonomous driving ON/OFF switch 70.

Firstly, as illustrated in FIG. 10, the vehicle position recognition unit 11 recognizes the vehicle position from the positional information of the vehicle V received by the GPS receiver 2 and the map information of the map database 4. The external situation recognition unit 12 recognizes the external situation regarding the vehicle V from the detection result of the external sensor 1. The traveling state recognition unit 13 recognizes the traveling state of the vehicle V from the detection result of the internal sensor 3 (S1). Then, the traveling plan generating unit 14 generates the traveling plan for the vehicle V from the target route of the navigation system 5, the vehicle position, the external situation regarding the vehicle V, and the traveling state of the vehicle V (S2). The traveling plan for the vehicle V is generated in this manner.

Figure 11:
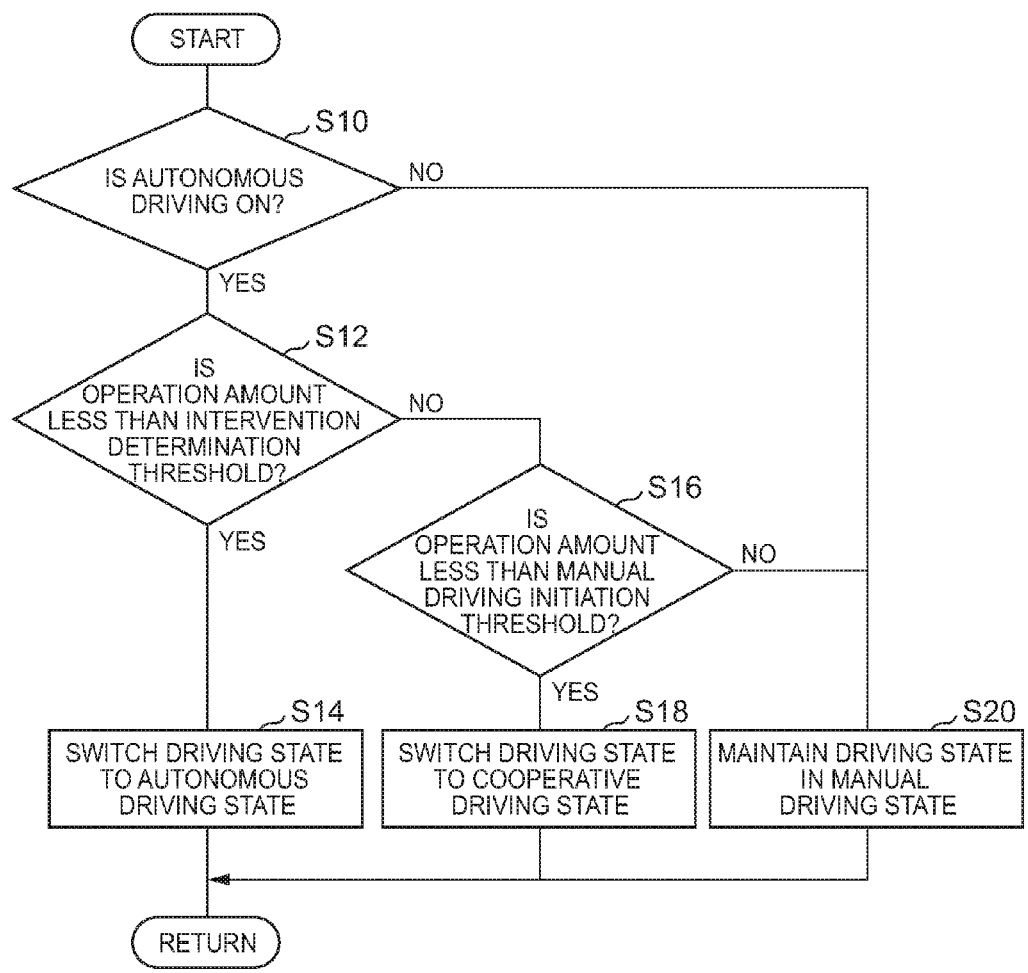
FIG. 11 is a flowchart showing an example of switching processing for switching the driving state from a manual driving state by using the operation amount of the driving operation.

Hereinafter, processing for switching the driving state of the vehicle V that is performed by the vehicle system 100 will be described. FIG. 11 is a flowchart showing an example of switching processing for switching the driving state of the vehicle V from the manual driving state by the use of the steering torque correlated with the steering operation. The control processing that is illustrated in FIG. 11 is repeatedly executed at a predetermined cycle in a case where the vehicle V is in the manual driving state.

Firstly, as illustrated in FIG. 11, the driving state switching unit 16 determines whether or not the autonomous driving initiation request operation is input into the autonomous driving ON/OFF switch 70 in a case where the driving state of the vehicle V is the manual driving state (S10). If so (yes at S10), then the driving state switching unit 16 performs determination processing (S12) using the intervention determination threshold Tk.

Figure 12:
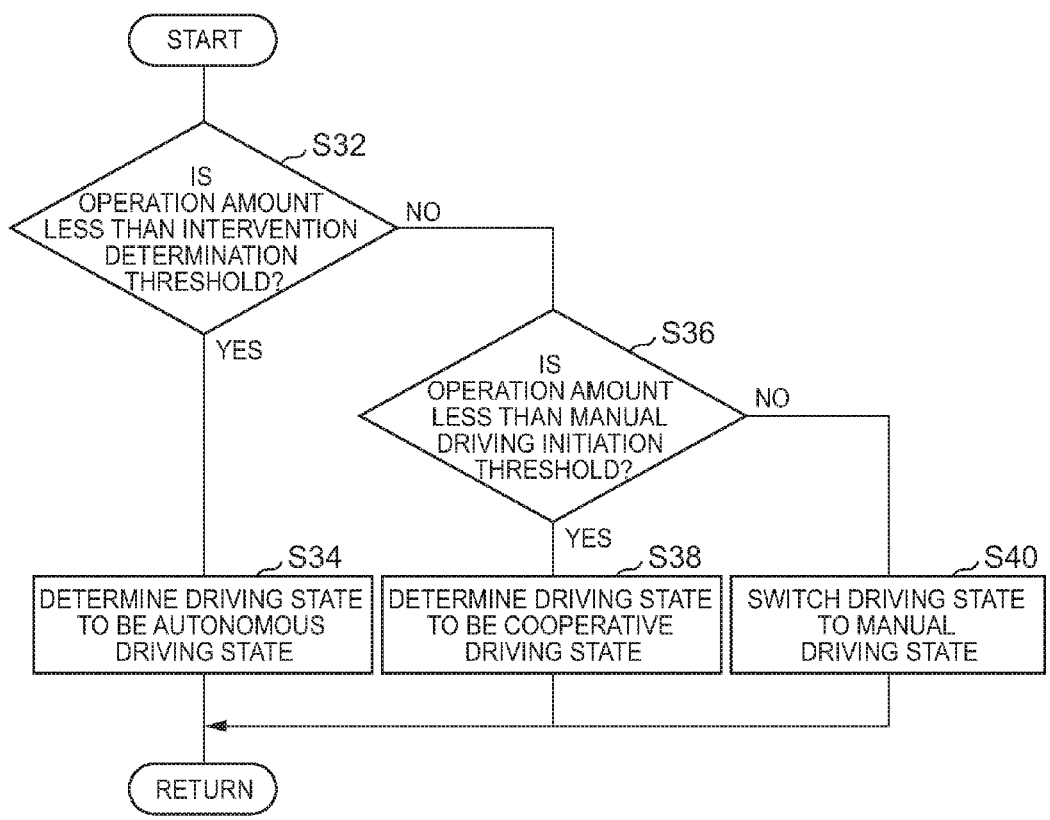
FIG. 12 is a flowchart showing an example of the switching processing for switching the driving state from the autonomous driving state or the cooperative driving state by using the operation amount of the driving operation.

The driving state switching unit 16 determines whether or not the steering torque based on the detection result of the internal sensor 3 is less than the intervention determination threshold Tk as the determination processing using the intervention determination threshold Tk that is illustrated in S12. In a case where it is determined that the steering torque based on the detection result of the internal sensor 3 is less than the intervention determination threshold Tk (yes at S12), the driving state switching unit 16 switches the driving state of the vehicle V to the autonomous driving state (S14). The flowchart that is illustrated in FIG. 11 is terminated when the switching processing that is illustrated in FIG. 14 is terminated. The driving state of the vehicle V is subjected to a transition from the manual driving state to the autonomous driving state and the driving state of the vehicle V is no longer the manual driving state, which is a precondition for the flowchart illustrated in FIG. 11. Accordingly, subsequent processing for repeating the flowchart illustrated in FIG. 11 is not performed and the flowchart that is illustrated in FIG. 12 (described later) is initiated.

If it is determined that the steering torque based on the detection result of the internal sensor 3 is not less than the intervention determination threshold Tk (no at S12), then the driving state switching unit 16 performs determination processing (S16) using the manual driving initiation threshold Th. The driving state switching unit 16 determines whether or not the operation amount T (such as the steering torque) based on the detection result of the internal sensor 3 is less than the manual driving initiation threshold Th as the determination processing using the manual driving initiation threshold Th that is illustrated in S16. If it is determined that the steering torque based on the detection result of the internal sensor 3 is less than the manual driving initiation threshold Th (yes at S16), then the driving state switching unit 16 switches the driving state of the vehicle V to the cooperative driving state (S18). The flowchart that is illustrated in FIG. 11 is terminated when the switching processing that is illustrated in S18 is terminated. The driving state of the vehicle V is subjected to a transition from the manual driving state to the cooperative driving state and the driving state of the vehicle V is no longer the manual driving state, which is a precondition for the flowchart illustrated in FIG. 11. Accordingly, subsequent processing for repeating the flowchart illustrated in FIG. 11 is not performed and the flowchart that is illustrated in FIG. 12 (described later) is initiated.

If it is determined that the steering torque based on the detection result of the internal sensor 3 is not less than the manual driving initiation threshold Th (no at S16), then the driving state switching unit 16 maintains the manual driving state (S20). Likewise, the driving state switching unit 16 maintains the manual driving state (S20) in a case where it is determined that the autonomous driving initiation request operation is not input into the autonomous driving ON/OFF switch 70 (no at S10). Then, the flowchart that is illustrated in FIG. 11 is terminated. The driving state of the vehicle V is not subjected to a transition from the manual driving state, and thus the flowchart that is illustrated in FIG. 11 is repeatedly executed thereafter.

Hereinafter, driving state switching processing that is performed by the vehicle system 100 in a case where the driving state of the vehicle V is the autonomous driving state or the cooperative driving state will be described. FIG. 12 is a flowchart showing an example of the switching processing for switching the driving state of the vehicle V to the autonomous driving state or the cooperative driving state by the use of the steering torque. The control processing that is illustrated in FIG. 12 is repeatedly executed at a predetermined cycle in a case where the vehicle V is in the autonomous driving state or the cooperative driving state.

Firstly, as illustrated in FIG. 12, the driving state switching unit 16 determines whether or not the steering torque based on the detection result of the internal sensor 3 is less than the intervention determination threshold Tk as the determination processing using the intervention determination threshold Tk that is illustrated in S32. If it is determined that the steering torque based on the detection result of the internal sensor 3 is less than the intervention determination threshold Tk (yes at S32), then the driving state switching unit 16 determines the driving state of the vehicle V to be the autonomous driving state (S34). In other words, the driving state switching unit 16 maintains the autonomous driving state in a case where the driving state of the vehicle V is the autonomous driving state and switches the driving state of the vehicle V to the autonomous driving state in a case where the driving state of the vehicle V is the cooperative driving state. The flowchart that is illustrated in FIG. 12 is terminated when the processing that is illustrated in S34 is terminated. The driving state of the vehicle V is not subjected to a transition to the manual driving state, and thus the flowchart that is illustrated in FIG. 12 is repeatedly executed thereafter.

If it is determined that the steering torque based on the detection result of the internal sensor 3 is not less than the intervention determination threshold Tk (no at S32), then the driving state switching unit 16 performs determination processing (S36) using the manual driving initiation threshold Th. The driving state switching unit 16 determines whether or not the steering torque based on the detection result of the internal sensor 3 is less than the manual driving initiation threshold Th as the determination processing using the manual driving initiation threshold Th that is illustrated in S36. If it is determined that the torque based on the detection result of the internal sensor 3 is less than the manual driving initiation threshold Th (yes at S36), then the driving state switching unit 16 determines the driving state of the vehicle V to be the cooperative driving state (S38). In other words, the driving state switching unit 16 switches the driving state of the vehicle V to the cooperative driving state in a case where the driving state of the vehicle V is the autonomous driving state and maintains the cooperative driving state in a case where the driving state of the vehicle V is the cooperative driving state. The flowchart that is illustrated in FIG. 12 is terminated when the processing that is illustrated in S38 is terminated. The driving state of the vehicle V is not subjected to a transition to the manual driving state, and thus the flowchart that is illustrated in FIG. 12 is repeatedly executed thereafter.

If it is determined that the steering torque based on the detection result of the internal sensor 3 is not less than the manual driving initiation threshold Th (no at S36), then the driving state switching unit 16 switches the driving state of the vehicle V to the manual driving state (S40). Then, the flowchart that is illustrated in FIG. 12 is terminated. The driving state is subjected to a transition from the autonomous driving state or the cooperative driving state to the manual driving state and the driving state of the vehicle V is no longer the autonomous driving state or the cooperative driving state, which is a precondition for the flowchart illustrated in FIG. 12. Accordingly, subsequent processing for repeating the flowchart illustrated in FIG. 12 is not performed and the flowchart that is illustrated in FIG. 11 is initiated.

As described above with reference to FIGS. 11 and 12, switching to and from the autonomous driving state, the cooperative driving state, and the manual driving state is performed by the driving state switching unit 16 based on the steering torque correlated with the steering operation. Although FIGS. 11 and 12 do not show a case where the driving state of the vehicle V is the autonomous driving state or the cooperative driving state and an autonomous driving termination request operation is input after the input of the autonomous driving initiation request operation into the autonomous driving ON/OFF switch 70, the driving state switching unit 16 performs processing for switching the driving state of the vehicle V from the autonomous driving state or the cooperative driving state to the manual driving state in this case.

In the above description, a case where the driving state switching unit 16 switches the driving state of the vehicle V based on the operation amount (steering torque) of the steering operation as an example of the driving operation has been described. However, the steering torque may be replaced with the steering angle or may be replaced with the accelerator pedal or brake pedal depression amount (pedal position). In other words, the driving state switching unit 16 may switch the driving state of the vehicle V based on the steering angle of the steering operation or may switch the driving state of the vehicle V based on the accelerator pedal or brake pedal depression amount.

Figure 13:
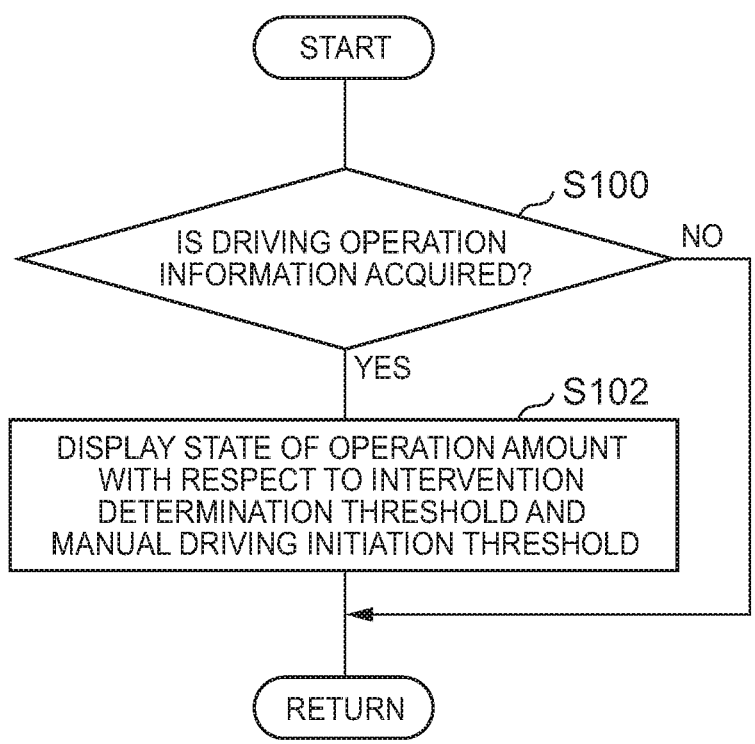
FIG. 13 is a flowchart showing an example of operation amount display processing.

Hereinafter, processing for displaying the operation amount T that is performed by the vehicle system 100 will be described. FIG. 13 is a flowchart showing an example of the processing for displaying the operation amount T. The control processing that is illustrated in FIG. 13 is repeatedly executed at a predetermined cycle in a case where, for example, the driving state of the vehicle V is the autonomous driving state or the cooperative driving state. The control processing that is illustrated in FIG. 13 may be repeatedly executed at a predetermined cycle even in a case where the driving state of the vehicle V is the manual driving state.

Firstly, as illustrated in FIG. 13, the driving operation information acquisition unit 15 determines whether or not the driving operation information is acquired (S100). In a case where it is determined that the driving operation information is not acquired (no at S100), the driving operation information acquisition unit 15 terminates the flowchart that is illustrated in FIG. 13. Then, the driving operation information acquisition unit 15 initiates the determination of S100 again in a predetermined period of time.

In a case where it is determined that the driving operation information is acquired by the driving operation information acquisition unit 15 (yes at S100), the information output unit 18 displays the state of the operation amount T with respect to the intervention determination threshold Tk and the manual driving initiation threshold Th by transmitting the control signal to the display 7a based on the driving operation information (S102).

In the vehicle system 100 according to this embodiment, the state of the operation amount T with respect to the intervention determination threshold Tk and the manual driving initiation threshold Th is displayed in the display 7a in a case where the driving state of the vehicle V is switched in accordance with the operation amount T, and thus the driver can be aware of the operation amount T until the driving state of the vehicle V is switched. Accordingly, with the vehicle system 100, the driver can switch the driving state of the vehicle V depending on the operation amount T at an intended timing.

The vehicle system 100 described above may also be capable of switching the driving state of the vehicle only between the two driving states of the autonomous driving state and the manual driving state. In this case, the vehicle system 100 displays the state of the operation amount T with respect to the manual driving initiation threshold Th in the display 7a, and thus the driver can be aware of the operation amount T until the driving state of the vehicle V is switched to the manual driving state. Accordingly, the driver can perform the switching to the manual driving state depending on the operation amount T at an intended timing. Likewise, the vehicle system 100 may be capable of switching the driving state of the vehicle only between the two driving states of the cooperative driving state and the manual driving state. Even in this case, the vehicle system 100 displays the state of the operation amount T with respect to the manual driving initiation threshold Th in the display 7a, and thus the driver can perform the switching to the manual driving state depending on the operation amount T at an intended timing.

An embodiment of the disclosure has been described above. The disclosure is not limited to the embodiment described above. The disclosure can have various forms in which various modifications and improvements are added, based on the knowledge of those skilled in the art, to the embodiment described above.

Figure 14A:
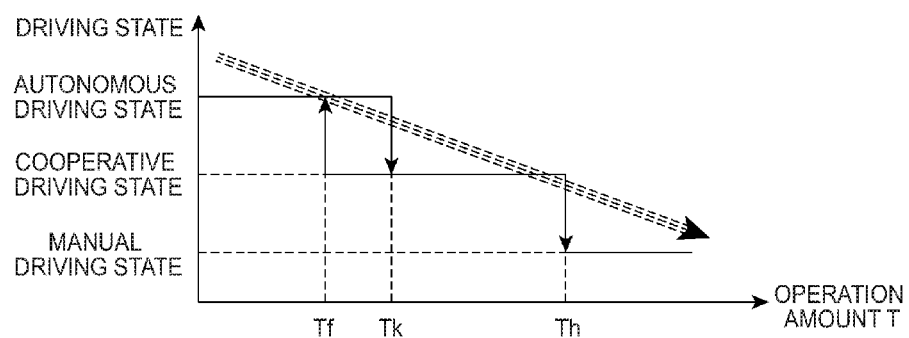
FIGS. 14A to 14C are diagrams showing another example of the relationship of the increase in the operation amount to the driving state transition, the post-migration notification ON/OFF, and the pre-migration notification ON/OFF, respectively.

[First modification example] In the above description of the embodiment, a case has been described where a single threshold is used as the threshold related to the switching from the autonomous driving state to the cooperative driving state and the threshold related to the switching from the cooperative driving state to the autonomous driving state. However, there may be different thresholds. FIG. 14A is a diagram showing another example of the driving state transition that is attributable to an increase in the operation amount T. As illustrated in FIG. 14A, the vehicle system 100 can have, for example, the intervention determination threshold Tk as the threshold related to the switching from the autonomous driving state to the cooperative driving state and an autonomous driving initiation threshold Tf as the threshold related to the switching from the cooperative driving state to the autonomous driving state. In other words, the vehicle system 100 maintains the driving state of the vehicle V in the cooperative driving state in a case where the operation amount T is equal to or greater than the autonomous driving initiation threshold Tf, even when the operation amount T becomes less than the intervention determination threshold Tk, after the driving state of the vehicle V is switched from the autonomous driving state to the cooperative driving state. When hysteresis is allowed to come into play as described above, frequent switching in state in the vicinity of the threshold can be avoided. The autonomous driving initiation threshold Tf may be any value less than the intervention determination threshold Tk. Specifically, frequent switching in driving state can be avoided when the operation amount is substantially equal to an intervention determination threshold T1.

As illustrated in FIG. 14A, the information output unit 18 changes the threshold displayed in the display unit 7a depending on the current driving state in a case where the threshold related to the switching changes depending on the current driving state. In a case where the driving state of the vehicle V is the autonomous driving state, for example, the information output unit 18 does not display the autonomous driving initiation threshold Tf and displays the intervention determination threshold Tk and the manual driving initiation threshold Th. In other words, the information output unit 18 displays the state of the operation amount T with respect to the intervention determination threshold Tk and the manual driving initiation threshold Th in the display unit 7*a*. In a case where the driving state of the vehicle V is the cooperative driving state, for example, the information output unit 18 does not display the intervention determination threshold Tk and displays the autonomous driving initiation threshold Tf and the manual driving initiation threshold Th. In other words, the information output unit 18 displays the state of the operation amount T with respect to the autonomous driving initiation threshold Tf and the manual driving initiation threshold Th in the display unit 7*a*. Even in a case where the driving state of the vehicle V is the manual driving state, for example, the information output unit 18 does not display the intervention determination threshold Tk and displays the autonomous driving initiation threshold Tf and the manual driving initiation threshold Th. Alternatively, the information output unit 18 may display only the manual driving initiation threshold Th in a case where the driving state of the vehicle V is the manual driving state.

In a case where the threshold related to the switching is changed depending on the current driving state, the information output unit 18 also changes the timing of the post-migration notification and the pre-migration notification as illustrated in FIG. 14A. In a case where the driving state of the vehicle V is the autonomous driving state, for example, the information output unit 18 turns ON the post-migration notification when the operation amount T increases and reaches the intervention determination threshold Tk. The information output unit 18 turns OFF the post-migration notification a predetermined period of time after the initiation of the post-migration notification.

Figure 14B:
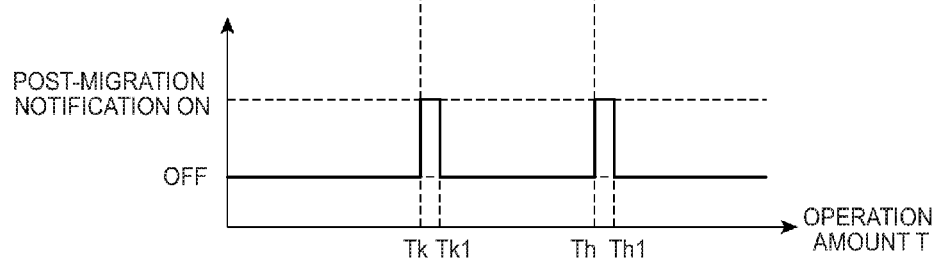

The information output unit 18 may turn OFF the post-migration notification in accordance with an increase in the operation amount T. FIG. 14B is a diagram showing another example of the relationship between an increase in the operation amount T and post-migration notification ON/OFF. As illustrated in FIGS. 14A and 14B, the information output unit 18 performs the post-migration notification until the operation amount T reaches the set value Tk1 after increasing to reach the intervention determination threshold Tk in a case where, for example, the driving state of the vehicle V is the autonomous driving state. In other words, the information output unit 18 turns ON the post-migration notification in a case where the operation amount T increases and reaches the intervention determination threshold Tk and turns OFF the post-migration notification in a case where the operation amount T continues to increase and reaches the set value Tk1.

In addition, the information output unit 18 turns ON the pre-migration notification when the operation amount T increases and reaches the set value Th0 in a case where, for example, the driving state of the vehicle V is the cooperative driving state. The information output unit 18 turns OFF the pre-migration notification a predetermined period of time after the initiation of the pre-migration notification.

Figure 14C:
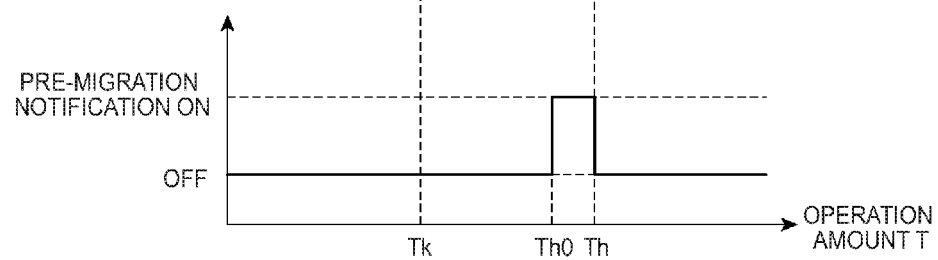

The information output unit 18 may turn OFF the pre-migration notification in accordance with an increase in the operation amount T. FIG. 14C is a diagram showing another example of the relationship between an increase in the operation amount T and pre-migration notification ON/OFF. As illustrated in FIGS. 14A and 14C, the information output unit 18 performs the pre-migration notification until the operation amount T reaches the manual driving initiation threshold Th after increasing to reach the set value Th0 in a case where, for example, the driving state of the vehicle V is the cooperative driving state.

Figure 15A:
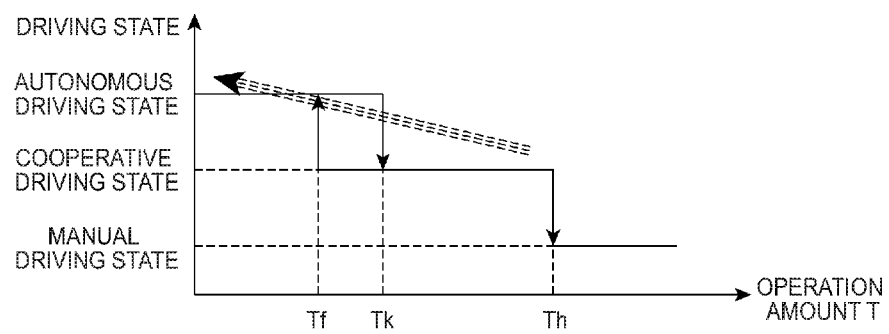
FIGS. 15A to 15C are diagrams showing another example of the relationship of the decrease in the operation amount to the driving state transition, the post-migration notification ON/OFF, and the pre-migration notification ON/OFF, respectively.

FIG. 15A is a diagram showing another example of the driving state transition that is attributable to a decrease in the operation amount T. As illustrated in FIG. 15A, the information output unit 18 does not perform the post-migration notification, even when the operation amount T decreases and becomes less than the intervention determination threshold Tk, in a case where the driving state of the vehicle V is the cooperative driving state because the driving state is not subjected to a migration to the autonomous driving state. The information output unit 18 turns ON the post-migration notification when the operation amount T decreases and becomes less than the autonomous driving initiation threshold Tf in a case where, for example, the driving state of the vehicle V is the cooperative driving state. The information output unit 18 turns OFF the post-migration notification a predetermined period of time after the initiation of the post-migration notification.

Figure 15B:
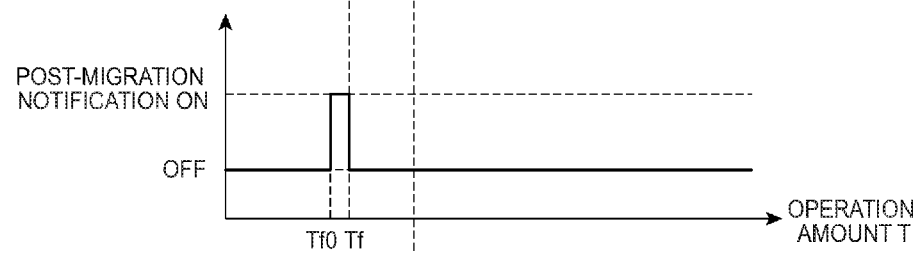

The information output unit 18 may turn OFF the post-migration notification in accordance with a decrease in the operation amount T. FIG. 15B is a diagram showing another example of the relationship between a decrease in the operation amount T and post-migration notification ON/OFF. As illustrated in FIGS. 15A and 15B, the information output unit 18 performs the post-migration notification until the operation amount T reaches a threshold Tf0 after decreasing to become less than an autonomous driving initiation threshold Tff in a case where, for example, the driving state of the vehicle V is the cooperative driving state. The threshold Tf0 is any value less than the autonomous driving initiation threshold Tf.

In addition, the information output unit 18 turns ON the pre-migration notification when the operation amount T decreases and becomes less than a set value Tf1 in a case where, for example, the driving state of the vehicle V is the cooperative driving state. The set value Tf1 is any value that exceeds the autonomous driving initiation threshold Tf and is less than the intervention determination threshold Tk. The information output unit 18 turns OFF the pre-migration notification a predetermined period of time after the initiation of the pre-migration notification.

Figure 15C:
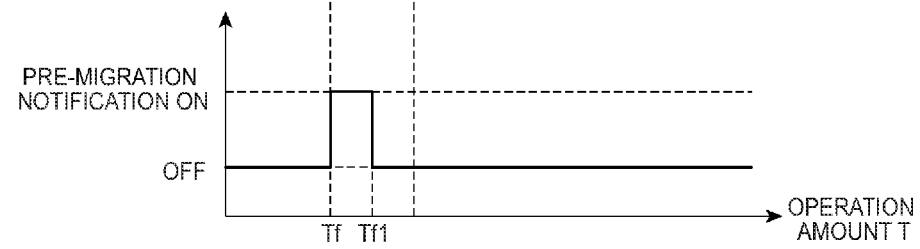

The information output unit 18 may turn OFF the pre-migration notification in accordance with a decrease in the operation amount T. FIG. 15C is a diagram showing another example of the relationship between a decrease in the operation amount T and pre-migration notification ON/OFF. As illustrated in FIGS. 15A and 15C, the information output unit 18 performs the pre-migration notification until the operation amount T becomes less than the autonomous driving initiation threshold Tf after decreasing to become less than the set value Tf1 in a case where, for example, the driving state of the vehicle V is the cooperative driving state.

[Second modification example] In the cooperative driving state of the embodiment described above, the cooperative driving may be performed by the use of a value that is obtained by weighting the operation amount of the driver's operation and the control target value based on the traveling plan. This setting allows the degree of the system intervention in the cooperative driving state to change, and thus allows a driving state development to be performed in view of the vehicle behavior. In a case where, for example, the steering torque is a control target, a target steering torque $T_R$ may be derived by the use of the following formula in which $T_D$ represents the driver's steering torque and Ts represents a system input torque.

$$T_R = w_1 \cdot T_D + w_2 \cdot Ts$$

$w_1$ and $w_2$ are weights. The weights $w_1$, $w_2$ may be constants or may be variable. For example, the weights $w_1$, $w_2$ may change in accordance with the speed of the vehicle V.

Figure 16A:
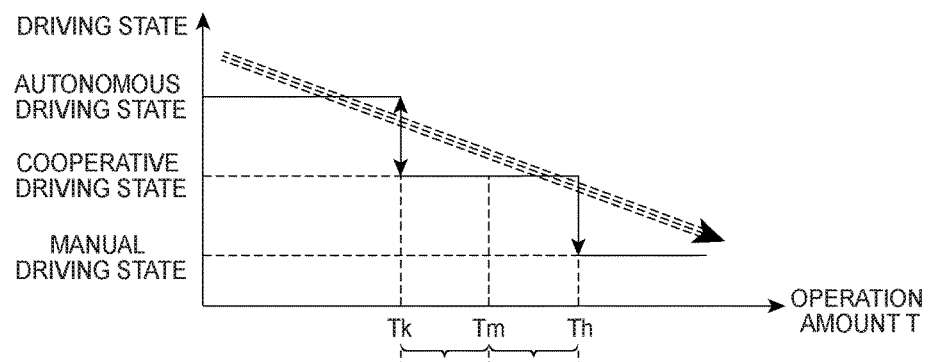
FIGS. 16A to 16C are diagrams showing yet another example of the relationship of the increase in the operation amount to the driving state transition, the post-migration notification ON/OFF, and the pre-migration notification ON/OFF, respectively.

FIG. 16A is a diagram showing yet another example of the driving state transition that is attributable to an increase in the operation amount T. FIG. 16A is a diagram showing an example of a weighted change in the cooperative driving state. According to FIG. 16A, the vehicle system 100 sets an intermediate threshold Tm that exceeds the intervention determination threshold Tk and is less than the manual driving initiation threshold Th and makes the weights $w_1$, $w_2$ for a section M1 between the intervention determination threshold Tk and the intermediate threshold Tm different than the weights $w_1$, $w_2$ for a section M2 between the intermediate threshold Tm and the manual driving initiation threshold Th as illustrated in FIG. 16A. In the section M1, the control target value based on the traveling plan is set to be more weighted than the operation amount of the driver's operation ($w_1 < w_2$). In the section M2, the control target value based on the traveling plan is set to be less weighted than the operation amount of the driver's operation ($w_1 > w_2$). A change in weighting in the cooperative driving state may be performed by the use of threshold setting as described above. Although FIG. 16A shows an example of a change in weighting with a single threshold, the change in weighting may be performed with two or more thresholds as well.

In a case where, for example, the three thresholds of the intervention determination threshold Tk, the intermediate threshold Tm, and the manual driving initiation threshold Th are used, the information output unit 18 displays all of the three thresholds in the display unit 7a as illustrated in FIG. 16A. The information output unit 18 displays the state of the operation amount T with respect to the three thresholds of the intervention determination threshold Tk, the intermediate threshold Tm, and the manual driving initiation threshold Th in the display unit 7a.

For example, the information output unit 18 displays the intermediate threshold Tm in a manner similar to how the intervention determination threshold Tk and the manual driving initiation threshold Th illustrated in FIGS. 4 to 6 are displayed. Alternatively, the information output unit 18 may display the intermediate threshold Tm, which is a threshold related to an internal parameter such as the weight, less clearly than the intervention determination threshold Tk and the manual driving initiation threshold Th. In other words, the information output unit 18 may not display the character of Tm in the second display example that is illustrated in FIG. 5, for example, while showing the intermediate threshold Tm as a boundary line based on a color difference or a boundary line based on a brightness difference between the intervention determination threshold Tk and the manual driving initiation threshold Th. By a similar method, the intermediate threshold Tm can also be displayed less clearly in the third and fourth display examples in FIG. 5.

As illustrated in FIG. 16A, the information output unit 18 turns ON the post-migration notification when the operation amount T increases and reaches any one of the intervention determination threshold Tk, the intermediate threshold Tm, and the manual driving initiation threshold Th. The information output unit 18 turns OFF the post-migration notification a predetermined period of time after the initiation of the post-migration notification.

Figure 16B:
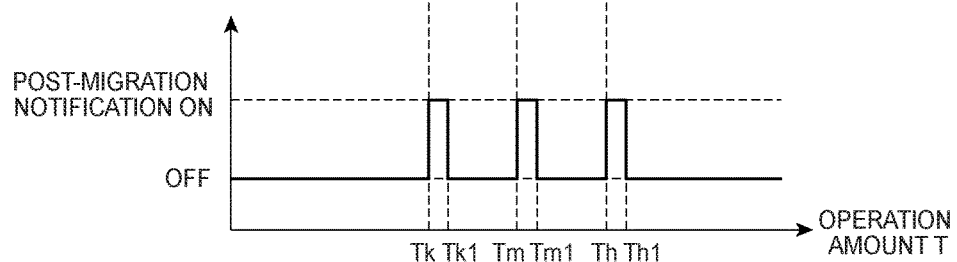

The information output unit 18 may turn OFF the post-migration notification in accordance with an increase in the operation amount T. FIG. 16B is a diagram showing yet another example of the relationship between an increase in the operation amount T and post-migration notification ON/OFF. As illustrated in FIGS. 16A and 16B, the information output unit 18 performs the post-migration notification until the operation amount T reaches the set value Tk1 after increasing to reach the intervention determination threshold Tk in a case where, for example, the driving state of the vehicle V is the autonomous driving state. In addition, the information output unit 18 performs the post-migration notification until the operation amount T reaches a set value Tm1 after increasing to reach the intermediate threshold Tm in a case where the driving state of the vehicle V is the cooperative driving state. In addition, the information output unit 18 performs the post-migration notification until the operation amount T reaches the set value Th1 after increasing to reach the manual driving initiation threshold Th. The set value Tm1 is any value that exceeds the intermediate threshold Tm and is less than the manual driving initiation threshold Th.

The information output unit 18 turns ON the pre-migration notification when, for example the operation amount T increases and reaches the set value Tk0, a set value Tm0, or the set value Th0. The information output unit 18 turns OFF the pre-migration notification a predetermined period of time after the initiation of the pre-migration notification. The set value Tm0 is any value that exceeds the intervention determination threshold Tk and is less than the intermediate threshold Tm.

Figure 16C:
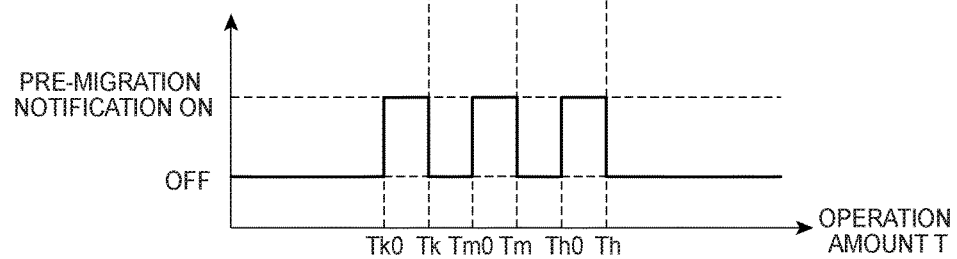

The information output unit 18 may turn OFF the pre-migration notification in accordance with an increase in the operation amount T. FIG. 16C is a diagram showing another example of the relationship between an increase in the operation amount T and pre-migration notification ON/OFF. As illustrated in FIGS. 16A and 16C, the information output unit 18 may perform the pre-migration notification until the operation amount T reaches the intervention determination threshold Tk after increasing to reach the set value Tk0 in a case where the driving state of the vehicle V is the autonomous driving state. In addition, the information output unit 18 may perform the pre-migration notification until the operation amount T reaches the intermediate threshold Tm after increasing to reach the set value Tm0 in a case where the driving state of the vehicle V is the cooperative driving state. In addition, the information output unit 18 may perform the pre-migration notification until the operation amount T reaches the manual driving initiation threshold Th after increasing to reach the set value Th0 in a case where the driving state of the vehicle V is the cooperative driving state.

According to FIGS. 16B and 16C, the information output unit 18 performs the post-migration notification and the pre-migration notification related to the intermediate threshold Tm. However, the information output unit 18 may not perform the post-migration notification and the pre-migration notification related to the intermediate threshold Tm. Likewise, the information output unit 18 may not perform the post-migration notification and the pre-migration notification related to the intervention determination threshold Tk. The information output unit 18 may perform one or none of the post-migration notification and the pre-migration notification related to the intermediate threshold Tm even in a case where the operation amount T decreases. In addition, the display of the relationship between the threshold and the operation amount in the display unit may be replaced with an audio notification or a notification in the form of vibration at a part with which the driver is in contact, examples of which include the steering wheel and a seat.

What is claimed is:

1. A vehicle system comprising:
an electronic control unit (ECU) configured to:
acquire an operation amount of a driving operation, and
switch a driving state of a vehicle between a first driving state and a second driving state based on a relationship between the operation amount of the driving operation and a first threshold; and
a display,
the first driving state including at least one of:
an autonomous driving state where traveling of the vehicle is controlled by using a traveling plan generated based on peripheral information regarding the vehicle and map information; and
a cooperative driving state where the vehicle travels with a vehicle control based on the peripheral information regarding the vehicle and the driving operation working in tandem with each other; and
the display is configured to notify a driver of a relationship between the first threshold and a state of the operation amount of the driving operation,
wherein the second driving state allows the driving operation to be reflected in the traveling of the vehicle,
wherein in the second driving state a driver of the vehicle controls a steering operation, an acceleration operation, and a braking operation of the vehicle, and
wherein the electronic control unit is configured to cause the display to display the state of the operation amount of the driving operation, wherein
the first driving state includes both the autonomous driving state and the cooperative driving state,
the ECU is configured to:
switch, in a case where the vehicle is in the autonomous driving state, the vehicle to the cooperative driving state in response to the operation amount of the driving operation becoming greater than or equal to a second threshold and less than the first threshold;
switch, in a case where the vehicle is in the cooperative driving state, the vehicle to the autonomous driving state in response to the operation amount of the driving operation becoming less than the second threshold; and
switch, in a case where the driving state of the vehicle is the cooperative driving state, the vehicle to the second driving state in response to the operation amount of the driving operation becoming greater than or equal to the first threshold, and
the display is configured to display a state of the operation amount of the driving operation with respect to the first threshold and the second threshold.

2. The vehicle system according to claim 1, wherein the operation amount of the driving operation includes an amount of at least one of a steering operation, an accelerator operation, and a brake operation of the vehicle.

3. A vehicle system comprising:
an electronic control unit (ECU) configured to:
switch a driving state of a vehicle between a first driving state and a second driving state, in which driving control of the vehicle is performed exclusively by a driver, on a basis of an operation amount of a driving operation and a first threshold value related to the operation amount of the driving operation, in the first driving state an autonomous driving state includes when the vehicle autonomously controls at least one of a steering operation, an acceleration operation, and braking operation, and in the second driving state a driver of the vehicle controls the steering operation, the acceleration operation, and the braking operation; and
a display configured to display a relationship between the first threshold value and the operation amount of the driving operation,
wherein
the first driving state includes both the autonomous driving state and a cooperative driving state,
the ECU is configured to:
switch, in a case where the vehicle is in the autonomous driving state, the vehicle to the cooperative driving state in response to the operation amount of the driving operation becoming greater than or equal to a second threshold and less than the first threshold;
switch, in a case where the vehicle is in the cooperative driving state, the vehicle to the autonomous driving state in response to the operation amount of the driving operation becoming less than the second threshold: and
switch, in case where the driving state of the vehicle is the cooperative driving state, the vehicle to the second driving state in response to the operation amount of the driving operation becoming greater than or equal to the first threshold, and
the display is configured to display a state of the operation amount of the driving operation with respect to the first threshold and the second threshold.

4. The vehicle system according to claim 3, wherein the display is configured to display the operation amount of the driving operation as a variable value.

5. The vehicle system according to claim 3, wherein the autonomous driving state is when the vehicle autonomously controls each of the steering operation, the acceleration operation, and the braking operation, and the cooperative driving state is when the vehicle autonomously controls only one or two of the steering operation, the acceleration operation, and the braking operation.

6. The vehicle system according to claim 5, wherein the ECU is configured to switch the driving state from the cooperative driving state to the autonomous driving state, in response to the driving state being the cooperative driving state and the operation amount of the driving operation being less than a third threshold value that is less than the second threshold value.

* * * * *